United States Patent [19]
Sugimoto et al.

[11] Patent Number: 5,959,695
[45] Date of Patent: Sep. 28, 1999

[54] 2-LINE YC SEPARATION DEVICE

[75] Inventors: Hiroko Sugimoto, Hirakata; Atsuhisa Kageyama, Ibaraki; Nobuo Taketani, Kawanishi, all of Japan

[73] Assignee: Matsushita Electric Industrial Co., Ltd., Osaka, Japan

[21] Appl. No.: 08/844,500

[22] Filed: Apr. 18, 1997

[30] Foreign Application Priority Data

Apr. 19, 1996 [JP] Japan ................................. 8-98238

[51] Int. Cl.⁶ ............................................ H04N 9/78
[52] U.S. Cl. ........................ 348/663; 348/664; 348/665
[58] Field of Search .................................. 348/663, 664, 348/665, 667, 668; H04N 9/78

[56] References Cited

U.S. PATENT DOCUMENTS 5,206,715  4/1993  Jung .
5,264,923  11/1993 Bhang .

FOREIGN PATENT DOCUMENTS 0 412 790   2/1991  European Pat. Off. .
1-117494    5/1989  Japan .
01206793    8/1989  Japan .
2 283 147   4/1995  United Kingdom .

OTHER PUBLICATIONS

European Search Report for EP 97 30 2663 dated Aug. 22, 1997.

Primary Examiner—Sherrie Hsia
Attorney, Agent, or Firm—Ratner & Prestia

[57] ABSTRACT

A 2-line YC separation device reduces the number of delay circuits used for horizontal scanning time delay and minimizing arithmetic operation errors of comb-line filters. The device comprises a first delay circuit for delaying an input video signal for a horizontal scanning period; a first band-pass filter circuit whose input is the input video signal, a second band-pass filter circuit whose input is the output signal of the first delay circuit, a Y-correlation detector whose input is the output signals of the first and second band-pass filter circuits, a C-correlation detector whose input is the output signals of the first and second band-pass filter circuits, a second delay circuit for delaying the output signal of the Y-correlation detector for a horizontal scanning period, a third delay circuit for delaying the output signal of the C-correlation detector for a horizontal scanning period; and an operational circuit whose input is the output signals of the Y-correlation detector and C-correlation detector and the output signals of the second and third delay circuits.

15 Claims, 17 Drawing Sheets

| | a | b 21 | c 1006 | (c-a)/2 1005 | -c 1007 | d 1001 | e 1003 | f 1002 | g 1004 | h 1008 | i 1009 | j 1010 | k 19 |
|---|---|---|---|---|---|---|---|---|---|---|---|---|---|
| (n+1)H | ∿ | ∿ | ∿ | — | ∿ | 0 | 1 | 0 | 1 | ∿ | — | — | ∿ |
| (n+2)H | ∿ | ∿ | ∿ | — | ∿ | 0 | 1 | 0 | 1 | ∿ | — | — | ∿ |
| (n+3)H | ∿ | ∿ | ∿ | — | ∿ | 0 | 1 | 0 | 1 | ∿ | — | — | ∿ |
| (n+4)H | — | — | ∿ | ∿ | ∿ | 0 | 0 | 0 | 1 | ∿ | ∿ | — | ∿ |
| (n+5)H | — | — | — | — | — | 1 | 1 | 0 | 0 | — | — | — | — |
| (n+6)H | — | — | — | — | — | 1 | 1 | 1 | 1 | — | — | — | — |

| | a | b 4104 5104 6104 | c 4109 5109 6109 | (c-a)/2 4110 5110 6110 | d 4105 5105 6105 | e 4106 5106 6106 | f 4108 5108 6108 | g 4107 5107 6107 | h 4111 5111 6110 | i 4112 5112 6109 | j 4113 5113 6113 | k 4102 5102 6102 |
|---|---|---|---|---|---|---|---|---|---|---|---|---|
| (n+1)H | ∿ | ∿ | ∿ | — | 0 | 1 | 0 | 1 | ∿ | — | ∿ | — |
| (n+2)H | ∿ | ∿ | ∿ | — | 0 | 1 | 0 | 1 | ∿ | — | ∿ | — |
| (n+3)H | ∿ | ∿ | ∿ | — | 0 | 1 | 0 | 1 | ∿ | — | ∿ | — |
| (n+4)H | ∿ | ∿ | ∿ | ∿ | 0 | 1 | 0 | 1 | ∿ | ∿ | ∿ | ∿ |
| (n+5)H | ∿ | ∿ | ∿ | — | 0 | 1 | 0 | 1 | ∿ | — | ∿ | — |
| (n+6)H | ∿ | ∿ | ∿ | — | 0 | 1 | 0 | 1 | ∿ | — | ∿ | — |

FIG. 13

| | a | b | c a-b | d | e | f | g c | h a-c | i | j |
|---|---|---|---|---|---|---|---|---|---|---|
| (n+1)H | ∿ | ∿ | — | — | 1 | 0 | — | ∿ | ∿ | — |
| (n+2)H | ∿ | ∿ | — | — | 1 | 0 | — | ∿ | ∿ | — |
| (n+3)H | ∿ | ∿ | — | — | 1 | 0 | — | ∿ | ∿ | — |
| (n+4)H | — | ∿ | ∿ | — | 1 | 1 | ∿ | ∿ | — | — |
| (n+5)H | — | — | — | — | 1 | 0 | — | — | — | — |
| (n+6)H | — | — | — | — | 1 | 0 | — | — | — | — |

FIG. 15 PRIOR ART

2-LINE YC SEPARATION DEVICE

FIELD OF THE INVENTION

The present invention relates to the field of comb-line filters for 2-line YC separation which can cut costs by reducing the number of delay circuits used for horizontal scanning time delay and also minimize arithmetic operation errors of comb-line filters as compared to the prior art.

BACKGROUND OF THE INVENTION 2-line YC separation devices are increasingly drawing attention as inexpensive means for accurately separating luminance and chrominance (YC) signals.

FIG. 14 is a block diagram of a 2-line YC separation device disclosed in Japanese Laid-open Patent No. H1-117494.

In FIG. 14, the reference numeral 2201 is the input video signal, 2202 is a one horizontal scanning time delay circuit (1HDL), 2203 is a subtractor, 2204 is also a subtractor, 2205 is a band-pass filter circuit (BPF), 2206 is a switch circuit, 2207 is a color subcarrier frequency trap circuit (T), 2208 is a switch circuit, 2209 is a luminance signal output, 2210 is a chroma signal output, 2211 is a low-pass filter circuit (LPF), 2212 is a YL-correlation detector (YL), 2213 is a band-pass filter circuit (BPF), 2214 is a chroma detector (C), and 2215 is an AND circuit.

The operation of a 2-line YC separation circuit configured as above is described below.

First, a signal, after passing through the one horizontal scanning time delay circuit 2202, is subtracted from the current video signal. Then, this signal is made into a YL correlation output signal, through the low pass filter circuit 2211 and the YL correlation detector 2212, and a detection output signal, through the chroma detector 2214 after filtering signals around the center of the color subcarrier frequency with the band-pass filter 2213. Both signals pass through the AND circuit 2215 and the output of AND circuit 2215 controls a comb-line filter.

More specifically, the switch circuit 2208 is turned on and, at the same time, the switch circuit 2206 is switched to the current video signal 2201 side only when the YL-correlation detector 2212 determines that i) there is no correlation, and ii) the chroma detector 2214 detects a chroma signal.

In other cases, for example, if the YL correlation detector 2212 determines that there is a correlation, or if the YL correlation detector 2212 determines that there is no correlation but the chroma detector 2214 detects no chroma signal, the switch circuit 2208 is turned off and the switch circuit 2206 is switched to the band-pass filter circuit 2205.

With the above configuration, however, YC in the input signal, with patterns illustrated as signal a in FIGS. 15, 16, and 17, cannot be accurately separated. Signal a in FIG. 15 is a pattern of a vertical line on a screen in which a luminance signal in the vertical direction, whose frequency is equivalent to that of the color subcarrier, exists up to (n+3)H and the luminance signal disappears thereafter. Signal a in FIG. 16 is a pattern in which a chroma signal exists up to (n+3)H and the chroma signal level is reduced thereafter. Signal a in FIG. 17 is a pattern of a vertical line on a screen in which a luminance signal in the vertical direction, whose frequency is equivalent to that of the color subcarrier, exists up to (n+3)H, and the luminance signal level is reduced thereafter.

In FIGS. 15, 16, and 17, signal a in is the input video signal; signal b is the output signal of the one horizontal scanning time delay circuit 2202: Signal c is the output signal of the subtractor 2203, or (a−b); signal d is the output signal of the low-pass filter circuit 2211; Signal e is the output of the YL-correlation detector 2212; Signal f is the output of the chroma detector 2214; Signal g in is the chroma signal; signal h is the luminance signal. Note that the amplitude of signals c and g in FIG. 16, however, are illustrated in half.

Since the output signal of the band-pass filter circuit 2205 is the result of filtering a frequency component of the color subcarrier in the output signal of the subtractor 2203, the output signal of the subtractor 2203 and the bandpass filter circuit 2205 become identical when a pattern such as signal a in FIGS. 15, 16, and 17 is input. Signal e in FIGS. 15, 16, and 17 becomes "1" when there is YL correlation, and "0" when there is no YL correlation. Signal f in FIGS. 15, 16, and 17 is "1" when a chroma signal exists and "0" when there is no chroma signal. Signal i in FIGS. 15, 16, and 17 is the optimal (desirable, ideal) luminance signal output. Signal j in FIGS. 15, 16, and 17 is the optimal chroma signal to be output.

Looking at signals e and f in FIG. 15, there is no signal in (n+1)H, (n+2)H, (n+3)H, (n+4)H, (n+5)H, and (n+6)H when the YL-correlation detector 2212 does not detect correlation, and the chroma detector 2214 detects the presence of the chroma signal. In other words, there is no signal where signal e is "0", at the same time signal f is "1". Consequently, the switch circuit 2208 is turned off and the switch circuit 2206 is switched to band-pass filter circuit 2205. In this case, the luminance signal output h becomes the same as the result of subtracting the output signal of the band-pass filter circuit 2205, which is equal to signal c in FIG. 15, from the current video signal, which is signal a in FIG. 15. Therefore, signal h in FIG. 15, which is equal to (a−c), is output. The chroma signal output g is the output signal of the band-pass filter circuit 2205 which is equal to the output signal of the subtractor 2203, or signal c in FIG. 15, and therefore signal g in FIG. 15 is output.

In the same way, looking at signals e and f in FIG. 16, there is no signal in (n+1)H, (n+2)H, (n+3)H, (n+4)H, (n+5)H, and (n+6)H when the YL-correlation detector 2212 does not detect correlation, and the chroma detector 2214 detects the presence of the chroma signal In other words, there is no signal where signal e is "0" at the same time signal f is "1". Consequently, the switch circuit 2208 is turned off and the switch circuit 2206 is switched to band-pass filter circuit 2205. In this case, the luminance signal output h becomes the same as the result of subtracting the output signal of the band-pass filter circuit 2205, which is equal to the output signal of the subtractor 2203, or signal c in FIG. 16, from the current video signal, or signal a in FIG. 16. Therefore, signal h in FIG. 16, which is equal to (a−c), is output. The chroma signal output g is the output signal of the band-pass filter circuit 2205 which is equal to the output signal of the subtractor 2203, or signal c in FIG. 16, and therefore signal g in FIG. 16 is output.

In the same way, looking at signals e and f in FIG. 17, there is no signal in (n+1)H, (n+2)H, (n+3)H, (n+4)H, (n+5)H, and (n+6)H when the YL-correlation detector 2212 does not detect correlation, and the chroma detector 2214 detects the presence of the chroma signal. In other words, there is no signal where signal e is "0" at the same time signal f is "1". Consequently, the switch circuit 2208 is turned off and the switch circuit 2206 is switched to the band-pass filter circuit 2205. In this case, the luminance signal output h is the same as subtracting the output signal of the band-pass filter circuit 2205, which is equal to the output signal of the subtractor 2203, or signal c in FIG. 17, from the current video signal, which is signal a in FIG. 17. Therefore, signal h in FIG. 17, which is equal to (a–c), is output. The chroma signal output g is the output signal of the band-pass filter circuit 2205 which is equal to the output signal of the subtractor 2203, or signal c in FIG. 17, and therefore signal g in FIG. 17 is output.

This means that in a pattern such as signal a in FIG. 15, comprising the luminance signal in a vertical direction on a screen, whose frequency is equivalent to that of a color subcarrier, which exists up to (n+3)H, and disappears from (n+4)H, the luminance signal displayed will be signal h in FIG. 15, and the chroma signal displayed will be signal g in FIG. 15. In a pattern such as signal a in FIG. 16 comprising the chroma signal up to (n+3)H with its level reduced from (n+4)H, the luminance signal displayed will be signal h in FIG. 16 and the chroma signal displayed will be signal g in FIG. 16. In a pattern such as signal a in FIG. 17 comprising the luminance signal up to (n+3)H with its level reduced from (n+4)H, the luminance signal displayed will be signal h in FIG. 17 and the chroma signal displayed will be signal g in FIG. 17. On the other hand, the optimal luminance signal to be output is signal i and the optimal chroma signal to be output is signal j in FIG. 15 when the input is signal a in FIG. 15. When signal a in FIG. 16 is input, the optimal luminance signal is signal i and the optimal chroma signal is signal j in FIG. 16. When signal a in FIG. 17 is input, the optimal luminance signal is signal i and the optimal chroma signal is signal j in FIG. 17.

As described above, conventional technology is incapable of separating YC signals correctly, and may result in erroneous display operation, in such as degraded horizontal resolution, appearance of color where there should be no color, and appearance of luminance components where color should be.

SUMMARY OF THE INVENTION

To solve the above problem, a 2-line YC separation device of the present invention comprises a first delay circuit for delaying an input video signal for horizontal scanning time; a first band-pass filter circuit whose input is the input video signal; a second-band pass filter circuit whose input is the output signal of the first delay circuit; a Y-correlation detector whose input is the output signals of the first and second band-pass filter circuits; a C-correlation detector whose input is the output signals of the first and second band-pass filter circuits; a second delay circuit for delaying the output signal of the Y-correlation detector for horizontal scanning time; a third delay circuit for delaying the output signal of the C-correlation detector for one horizontal scanning time; a first inverter whose input is the output signal of the first band-pass filter; a first subtractor whose input is the output signals of the first and second band-pass filter circuits; an amplitude adjusting circuit whose input is the output signal of the first subtractor; a first switch determining circuit whose input is the output signals of the Y-correlation detector and C-correlation detector and the output signals of the second and third delay circuits; a second switch determining circuit whose input is the output signals of the Y-correlation detector and C-correlation detector and the output signals of the second and third delay circuit; a second inverter whose input is the output signal of the second band-pass filter circuit; a first switch circuit which switches among the output signal of the amplitude adjusting circuit, the output signal of the second inverter, and the output signal of the second band-pass filter, depending on the output signal of the first switch determining circuit; a second switch circuit which switches between the output signal of the amplitude adjusting circuit and the output signal of the second band-pass filter, depending on the output signal of the second switch determining circuit; a 3-line-comb operational circuit whose input is the output signal of the first inverter and the output signal of the first and second switch circuits; a second subtractor whose input is the output signal of the first delay circuit and the output signal of the 3-line-comb operational circuit; and a filter circuit whose input is the output signal of the 3-line-comb operational circuit.

The present invention reduces erroneous operation related to the aforementioned problems which occurred with conventional technology, and thus provides a 2-line YC separation device with fewer horizontal scanning time delay circuits.

BRIEF DESCRIPTION OF THE DRAWINGS

FIG. 8 is an explanatory drawing of the operation of the 2-line YC separation device in the first exemplary embodiment of the present invention.

FIGS. 9A and 9B are explanatory drawings of logic operation of the 2-line YC separation device in the first exemplary embodiment of the present invention.

FIGS. 11A and 11B are explanatory drawings of logic operation of the 2-line YC separation device in the second exemplary embodiment.

FIG. 12 is an explanatory drawing of the 2-line YC separation device in third, fifth, and sixth exemplary embodiments of the present invention.

FIG. 13 is an explanatory drawing of the operation of the 2-line YC separation device in fourth, fifth and sixth exemplary embodiments.

FIG. 15 is an explanatory drawing of a first operation of the conventional 2-line YC separation device.

DESCRIPTION OF THE PREFERRED EMBODIMENTS

Exemplary embodiments 1 to 6 of the present invention are described below with reference to the drawings.

First Exemplary Embodiment

A first exemplary embodiment of the present invention is explained with reference to FIG. 1, FIG. 7, FIG. 8, FIG. 9A, FIG. 9B, and FIG. 15.

Figure 1:
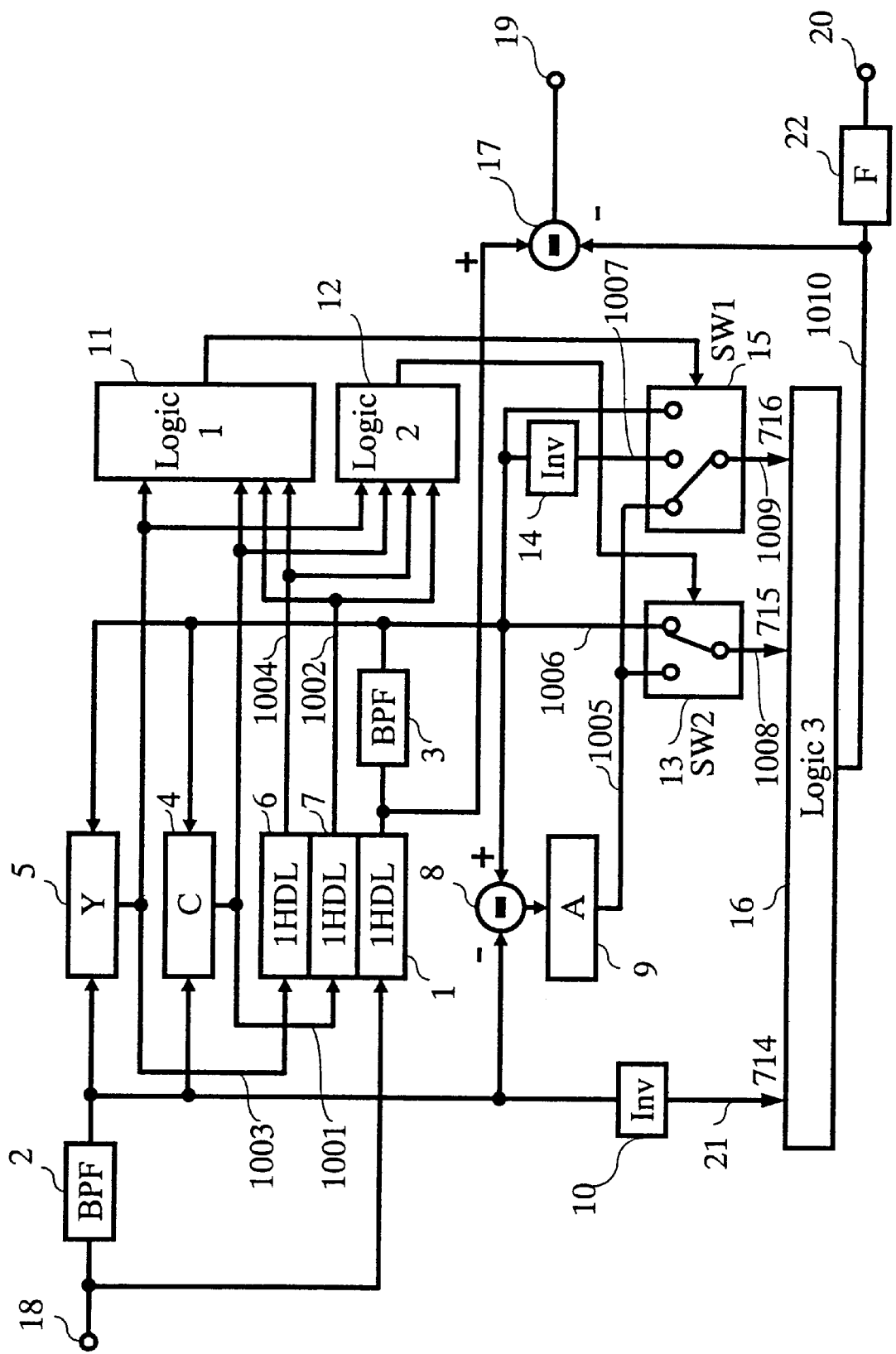
FIG. 1 is a block diagram of a 2-line YC separation device in a first exemplary embodiment of the present invention.

In FIG. 1, reference numeral 1 is a delay circuit (1HDL) for delaying the input video signal for one horizontal scanning period; 2 is a band-pass filter circuit (BPF) whose input is the input video signal; 3 is a band-pass filter circuit (BPF) whose input is the output signal of the delay circuit 1; 4 is a C-correlation detector (C) whose input is the output signals of the band-pass filter circuits 2 and 3; 5 is a Y-correlation detector (Y) whose input is the output signals of the band-pass filter circuits 2 and 3; 6 is a delay circuit (1HDL) for delaying the output signal of the Y-correlation detector 5 for one horizontal scanning period; 7 is a delay circuit (1HDL) for delaying the output signal of the C-correlation detector 4 for one horizontal scanning period; 8 is a subtractor whose input is the output signals of the band-pass filter circuits 2 and 3; 9 is an amplitude adjusting circuit (A) which reduces the output signal of the subtractor 8 by one-half; 10 is an inverter (Inv) whose input is the output signal of the band-pass filter circuit 2; 11 is a switch determining circuit (Logic 1) whose input is the output signal of the Y-correlation detector 5, the output signal of the C-correlation detector 4, and the output signal of the delay circuits 6 and 7; 12 is a switch determining circuit (Logic 2) whose input is the output signal of the Y-correlation detector 5, the output signal of the C-correlation detector 4, and the output signals of the delay circuits 6 and 7; 13 is a switch circuit (SW2) whose input is the output signal of the amplitude adjusting circuit 9 and the output signal of the band-pass filter circuit 3; 14 is an inverter (Inv) whose input is the output signal of the band-pass filter circuit 3; 15 is a switch circuit (SW1) whose input is the output signal of the amplitude adjusting circuit 9, the output signal of the inverter 14, and the output signal of the band-pass filter circuit 3; 16 is a 3-line-comb operational circuit (Logic 3) whose input is the output signal of the inverter 10, the output signal of the switch circuit 13, and the output signal of the switch circuit 15; 17 is a subtractor whose input is the output signal of the delay circuit 1 and the output signal of the 3-line-comb operational circuit 16; 18 is the input video signal; 19 is the luminance signal output; 20 is the chroma signal output; 21 is the output signal of the inverter 10; 22 is a filter circuit (F) whose input is the output signal of the 3-line-comb operational circuit 16; 1001 is the output signal of the C-correlation detector 4; 1002 is the output signal of the delay circuit 7; 1003 is the output signal of the Y-correlation detector 5; 1004 is the output signal of the delay circuit 6; 1005 is the output signal of the amplitude adjusting circuit 9; 1006 is the output signal of the band pass filter circuit 3; 1007 is the output signal of the inverter 14; 1008 is the output signal of the switch circuit 13; 1009 is the output signal of the switch circuit 15; and 1010 is the output signal of the 3-line-comb operational circuit 16.

Operation of a 2-line YC separation device configured as above is outlined next. Operation details follow with reference to FIGS. 8, 9A, and 9B.

The band-pass filter circuits 2 and 3 are filters which pass signals in the band centering on the frequency of the color subcarrier. The C-correlation detector 4 is a circuit which judges a signal to be correlated when a chroma signal is input. The Y-correlation detector 5 is a circuit which judges a signal to be correlated when a luminance signal is input.

The delay circuit 6 delays a one-bit signal, the output signal of the Y-correlation detector 5, for one horizontal scanning interval. The delay circuit 7 delays a one-bit signal, the output signal of the C-correlation detector 4, for one horizontal scanning interval. The switch determining circuit 11 conducts a logic operation on the output signals of the correlation detectors 4 and 5 and the delay circuits 6 and 7, and generates a control signal for switching switch circuit 15. The switch determining circuit 12 conducts a logic operation on the output signals of the correlation detectors 4 and 5 and the delay circuits 6 and 7, and generates a control signal for switching switch circuit 13.

Figure 7:
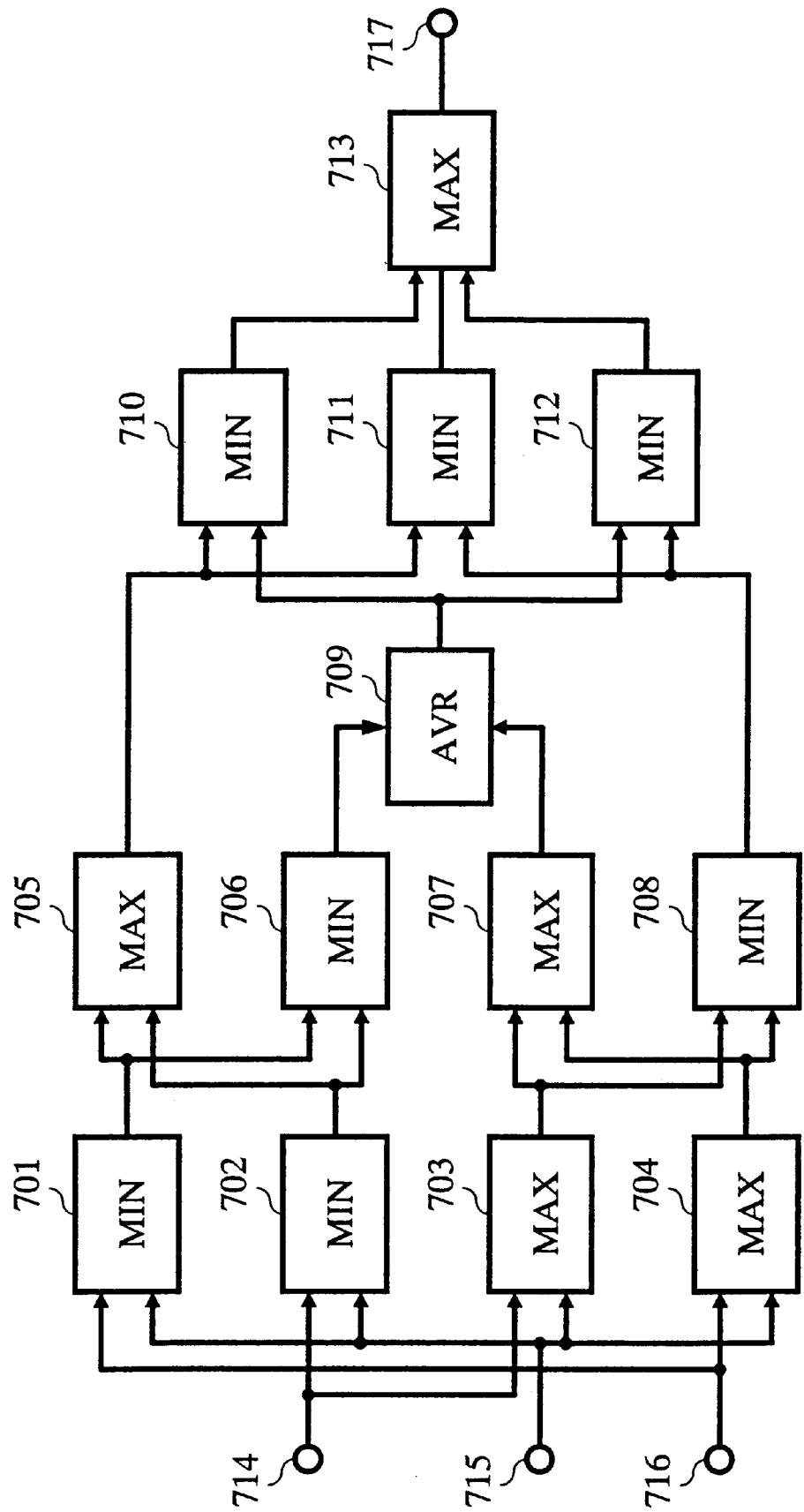
FIG. 7 is a block diagram of a 3-line-comb operational circuit.

The switch circuits 13 and 15 form an adaptive comb-line filter. The switch circuit 13 switches between the output signals 1005 and 1006, and the switch circuit 15 switches between the output signals 1005, 1007, and 1006. FIG. 7 illustrates the 3-line-comb operational circuit 16. It is a filter originally developed for 3-line-comb operational circuits. In general, the 3-line-comb operational circuit 16 comprises three signal input terminals which are a signal terminal for a 0H line, a signal terminal for a 1H line, and a signal terminal for a 2H line. In the present invention, the output signal 1009 of the switch circuit 15 is input to an input terminal 716 as the 2H line, the output signal 1008 of the switch circuit 13 is input to an input terminal 715 as the 1H line, and the output signal 21 of inverter 10 is input to an input terminal 714 as the 0H line.

The subtractor 17 subtracts the output signal of the 3-line-comb operational circuit 16 from the output signal of the delay circuit 1, and generates the luminance signal output 19. The filter circuit 22 filters the output signal of the 3-line-comb operational circuit 16, and generates the chroma signal output 20.

Figures 9A, 9B:
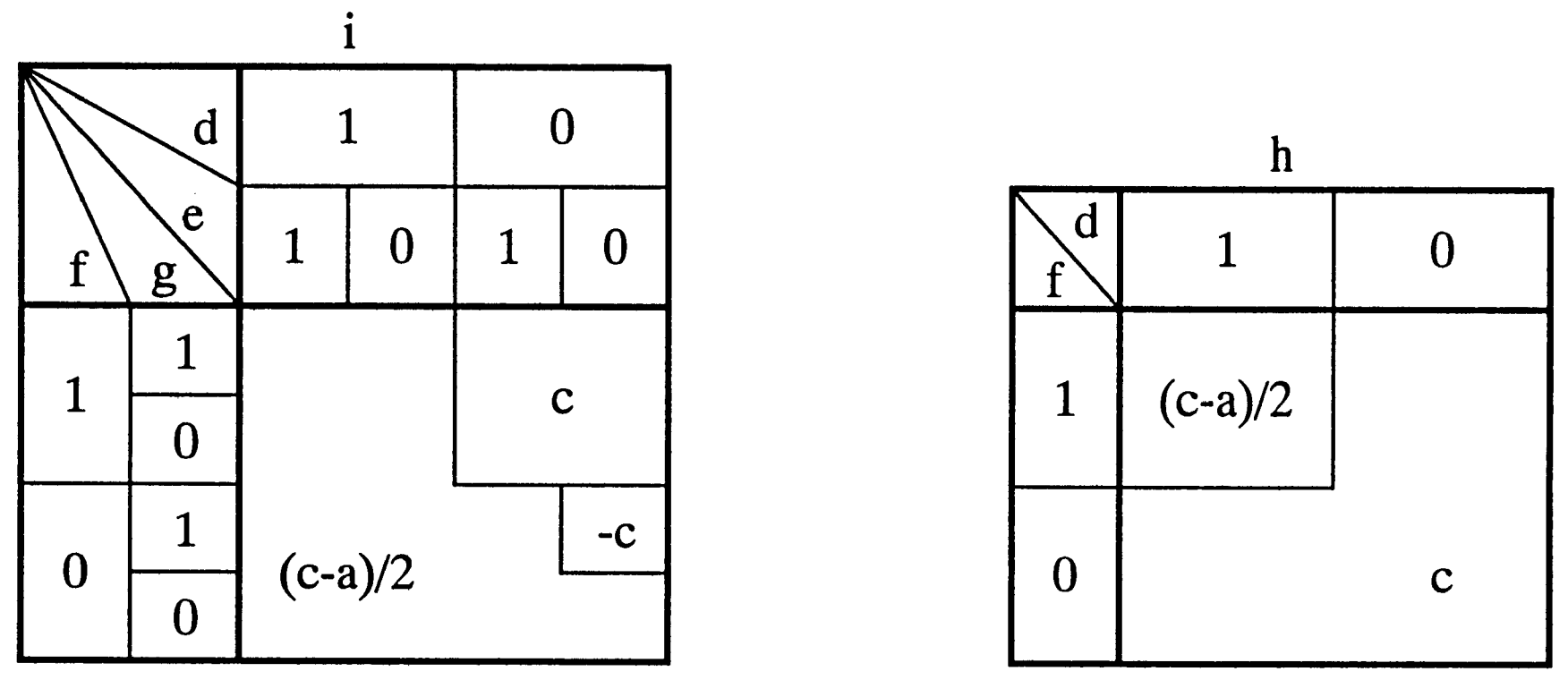

Next, operation of the exemplary embodiment is explained with reference to FIGS. 8, 9A, and 9B. FIG. 8 illustrates the waveform at each part when the pattern of signal a in FIG. 15 is input to the present invention. FIG. 9A shows the logic operation results of the adaptive switch circuit as determined by the switch determining circuit 11, and FIG. 9B shows the logic operation of switch determining circuit 12. FIG. 9A illustrates that signal i is determined based on the combination of signals d, e, f, and g in FIG. 8. It shows that signal i will be signal c, −c, or (c−a)/2 depending on the combination of signals d, e, f, and g. Here, −c signifies that the phase of signal c is inverted. FIG. 9B illustrates that signal h is determined based on the combination of signals d and f in FIG. 8. It shows that signal h will be either signal c or (c−a)/2 depending on the combination of signals d and f.

In FIG. 8, signal a is the output signal of the band-pass filter circuit 2, signal b is the output signal 21 of the inverter 10, signal c is the output signal 1006 of the band-pass filter circuit 3, signal (c−a)/2 is the output signal 1005 of the amplitude adjusting circuit 9, signal −c is the output signal 1007 of the inverter 14, signal d is the output signal 1001 of the C-correlation detector 4, signal e is the output signal 1003 of the Y-correlation detector 5, signal f is the output signal 1002 of the delay circuit 7, signal g is the output signal 1004 of the delay circuit 6, signal h is the output signal 1008 of the switch circuit 13, signal i is the output signal 1009 of the switch circuit 15, signal j is the output signal 1010 of the 3-line-comb operational circuit 16, and signal k is the luminance signal output 19.

First, signals indicated as signal h and i in FIG. 8 are output based on the output of signals d, e, f, and g in FIG. 8 and the logic operation table in FIGS. 9A and 9B. Next, signals are input to each input terminal of the 3-line-comb operational circuit 16 illustrated in FIG. 7. Specifically, signal b in FIG. 8 is input to the input terminal 714; Signal h in FIG. 8 is input to the input terminal 715; and signal i in FIG. 8 is input to the input terminal 716. The output signal of the 3-line-comb operational circuit 16 will be signal j of FIG. 8. A luminance signal is obtained by subtracting the output of the 3-line-comb operational circuit 16 from the input of the band-pass filter 3. Since the waveforms of the luminance signal at the input and output of the band-pass filter 3 are identical, the waveform of the luminance signal is obtained by subtracting signal j from signal c in FIG. 8, creating the waveform of signal k in FIG. 8.

It will be apparent that the invention, as described above, achieves the same waveform as that of signal i in FIG. 15, the optimal luminance signal output, and signal j in FIG. 15, the optimal chroma signal output. In other words, the present invention is capable of completely separating the YC of patterns which were previously not separable using conventional YC separation devices. It should be noted, however, that there is one horizontal scanning time difference between the exemplary embodiment of the present invention and conventional YC separation devices.

Second Exemplary Embodiment

A second exemplary embodiment of the present invention is explained with reference to FIG. 2, FIG. 7, FIG. 10, FIG. 11A, FIG. 11B, and FIG. 15.

Figure 2:
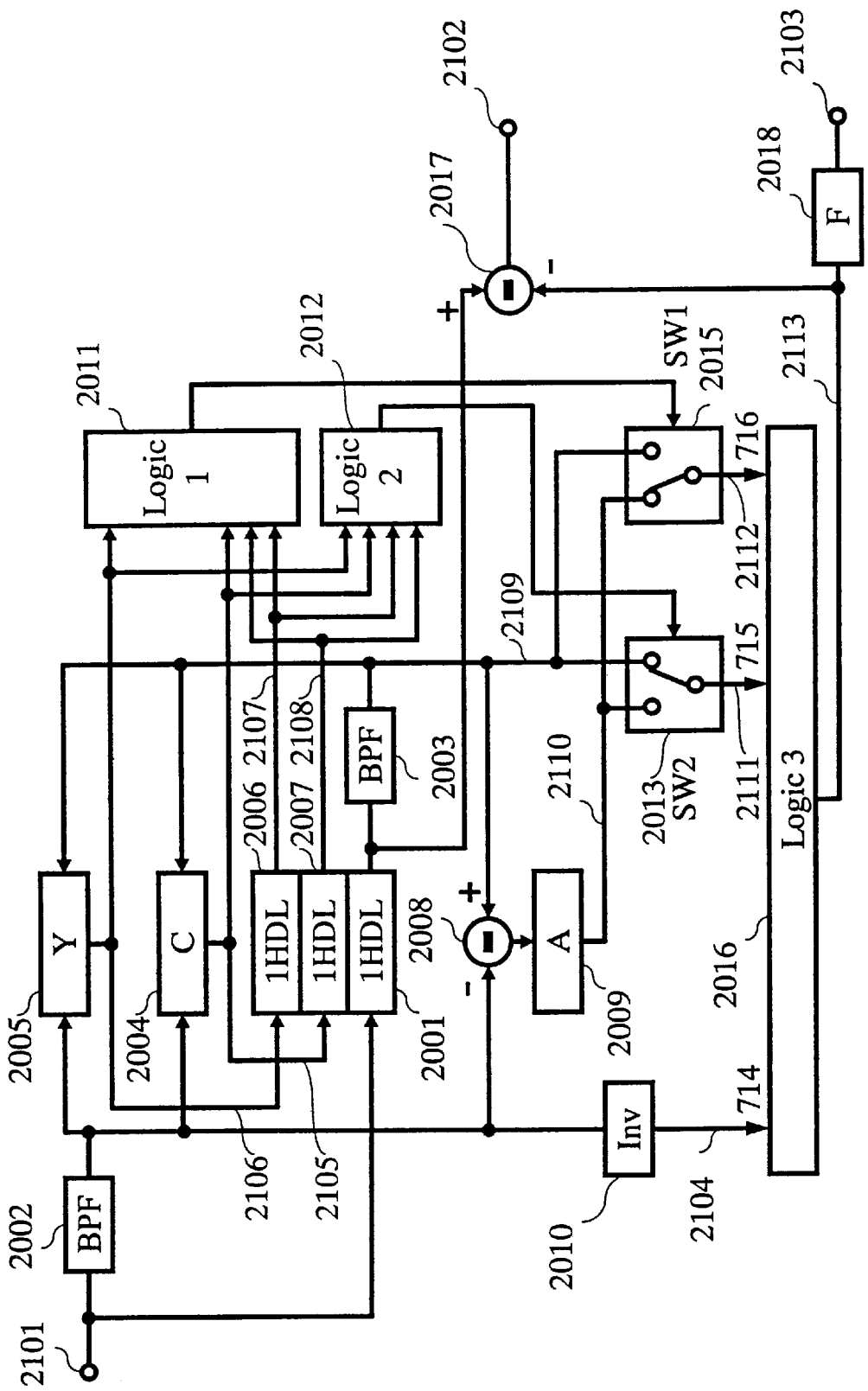
FIG. 2 is a block diagram of a 2-line YC separation device in a second exemplary embodiment of the present invention.

In FIG. 2, reference numeral 2001 is a delay circuit (1HDL) for delaying the input video signal for horizontal scanning time; 2002 is a band-pass filter circuit (BPF) whose input is the input video signal; 2003 is a band-pass filter circuit (BPF) whose input is the output signal of the delay circuit 2001; 2004 is a C-correlation detector (C) whose input is the output signals of the band-pass filter circuits 2002 and 2003; 2005 is a Y-correlation detector (Y) whose input is the output signals of the band-pass filter circuits 2002 and 2003; 2006 is a delay circuit (1HDL) for delaying the output signal of the Y-correlation detector 2005 for horizontal scanning time; 2007 is a delay circuit (1HDL) for delaying the output signal of the C-correlation detector 2004 for horizontal scanning time; 2008 is a subtractor whose input is the output signals of the band-pass filter circuits 2002 and 2003; 2009 is an amplitude adjusting circuit (A) which reduces the output signal of the subtractor 2008 by one-half, 2010 is an inverter (Inv) whose input is the output signal of the band-pass filter circuit 2002; 2011 is a switch determining circuit (Logic 1) whose input is the output signal of the Y-correlation detector 2005, the output signal of the C-correlation detector 2004, and the output signals of the delay circuits 2006 and 2007; 2012 is a switch determining circuit (Logic 2) whose input is the output signal of the Y-correlation detector 2005, the output signal of the C-correlation detector 2004, and the output of the delay circuits 2006 and 2007; 2013 is a switch circuit (SW2) whose input is the output signal of the amplitude adjusting circuit 2009 and the output signal of the band-pass filter circuit 2003; 2015 is a switch circuit (SW1) whose input is the output signal of the amplitude adjusting circuit 2009 and the output signal of the band-pass filter circuit 2003; 2016 is a 3-line-comb operational circuit (Logic 3) whose input is the output signal of the inverter 2010, the output signal of the switch circuit 2013, and the output signal of the switch circuit 2015; 2017 is a subtractor whose input is the output signal of the delay circuit 2001 and the output signal of the 3-line-comb operational circuit 2016; 2018 is a filter circuit (F) whose input is the output signal of the 3-line-comb operational circuit 2016; 2101 is an input video signal; 2102 is the luminance signal output; 2103 is the chroma signal output; 2104 is the output signal of the inverter 2010; 2105 is the output signal of the C-correlation detector 2004; 2106 is the output signal of the Y-correlation detector 2005; 2107 is the output signal of the delay circuit 2006; 2108 is the output signal of the delay circuit 2007; 2109 is the output signal of the band-pass filter circuit 2003; 2110 is the output signal of the amplitude adjusting circuit 2009; 2111 is the output signal of the switch circuit 2013; 2112 is the output signal of the switch circuit 2015; and 2113 is the output signal of the 3-line-comb operational circuit 2016.

Operation of a 2-line YC separation device configured as above is outlined next. Operation details follow with reference to FIGS. 10, 11A, and 11B.

The band-pass filter circuits 2002 and 2003 are filters which pass signals in the band centered on the frequency of the color subcarrier. The C-correlation detector 2004 is a circuit which judges a signal to be correlated when a chroma signal is input. The Y-correlation detector 2005 is a circuit which judges a signal to be correlated when a luminance signal is input.

The delay circuit 2006 delays a one-bit signal, the output signal of the Y-correlation detector 2005, for one horizontal scanning interval. The delay circuit 2007 is a circuit which delays a one-bit signal, the output signal of the C-correlation detector 2004, for one horizontal scanning interval. The switch determining circuit 2011 conducts logic operation of the output signals of the correlation detectors 2004 and 2005 and the delay circuits 2006 and 2007, and generates a control signal for switching switch circuit 2015. The switch determining circuit 2012 conducts logic operation of the output signals of the correlation detectors 2004 and 2005 and the delay circuits 2006 and 2007, and generates a control signal for switching switch circuit 2013.

The switch circuits 2013 and 2015 form an adaptive comb-line filter. The switch circuit 2013 switches between the output signal 2110 of the amplitude adjusting circuit 2009 and the output signal 2109 of the band-pass filter circuit 2003, and the switch circuit 2015 switches between the output signal 2110 of the amplitude adjusting circuit 2009 and the output signal 2109 of the band-pass filter circuit 2003. FIG. 7 illustrates the 3-line-comb operational circuit 2016. It is a filter originally developed for 3-line-comb operational circuits, and in the present invention, the output signal 2112 of the switch circuit 2015 is input to an input terminal 716, the output signal 2111 of the switch circuit 2013 is input to an input terminal 715, and the output signal 2104 is input to an input terminal 714 as.

The subtractor 2017 subtracts the output signal 2113 of the 3-line-comb operational circuit 2016 from the output signal of the delay circuit 2001, and generates the luminance signal output 2102. The filter circuit 2018 filters the output signal 2113 of the 3-line-comb operational circuit 2016, and generates the chroma signal output 2103.

Figure 10:
FIG. 10 is an explanatory drawing of the operation of the 2-line YC separation device in the second exemplary embodiment of the present invention.
Figures 11A, 11B:
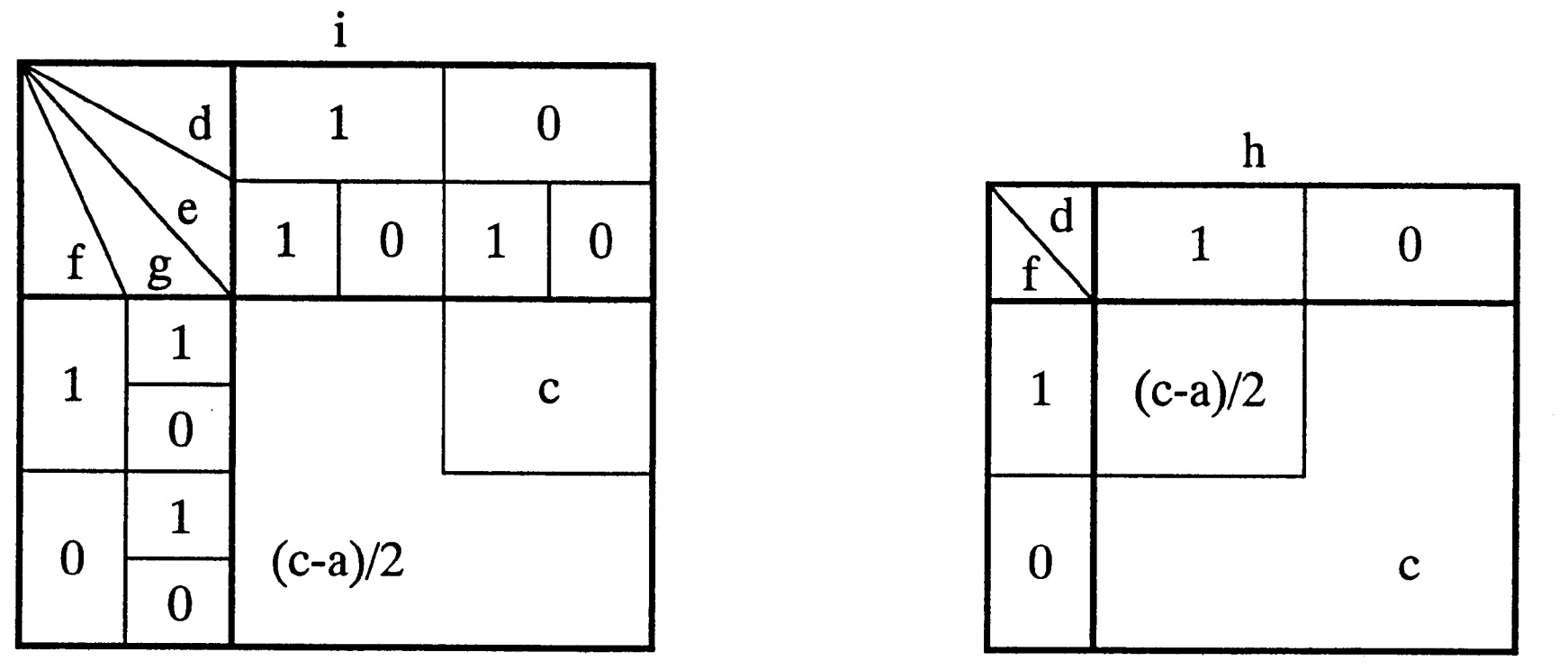
Figure 14:
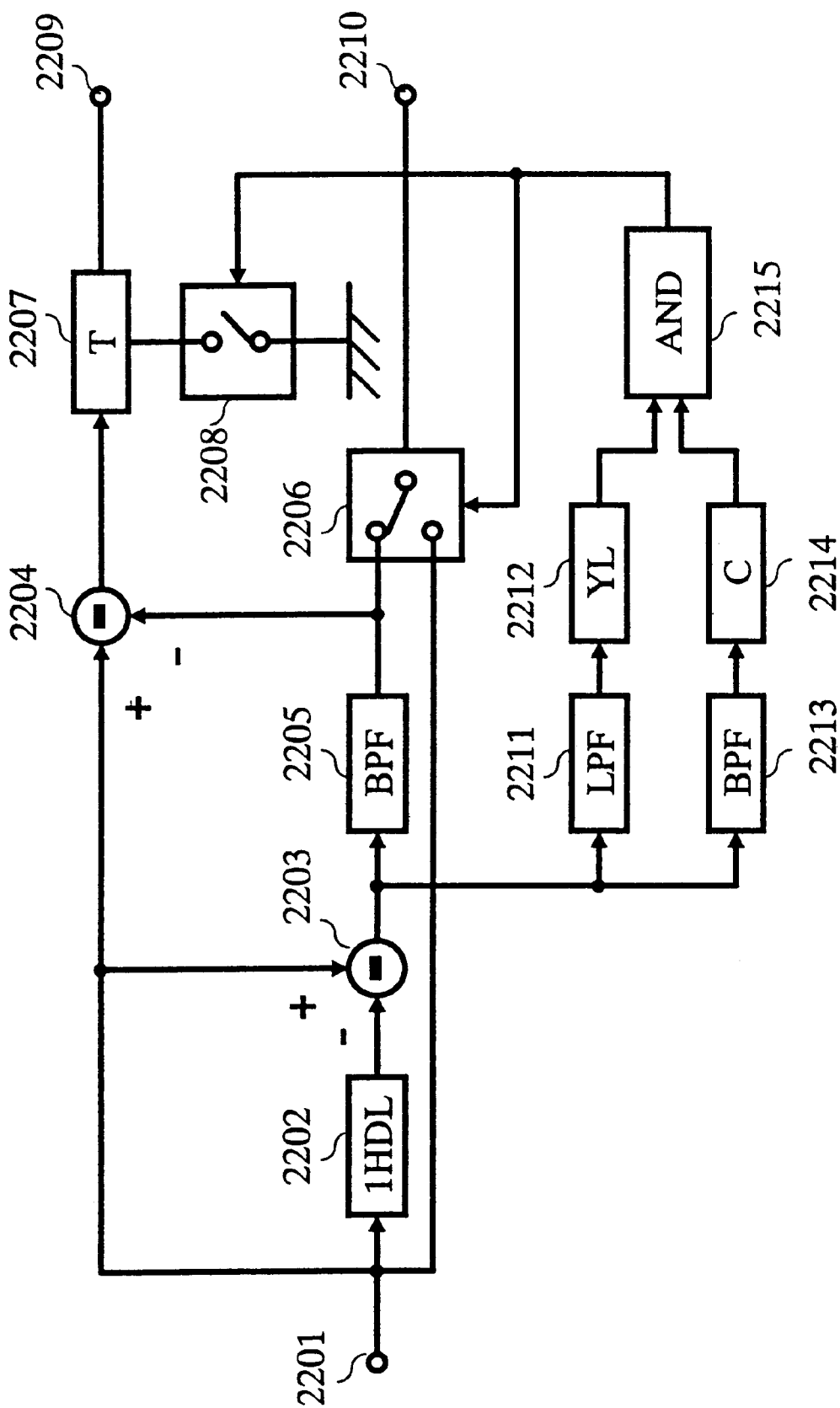
FIG. 14 is a block diagram of a conventional 2-line YC separation device.

Next, operation of the exemplary embodiment is explained with reference to FIGS. 10, 11A, and 11B. FIG. 10 illustrates the waveform at each part when the pattern of signal a in FIG. 15 is input to the present invention. FIG. 11A shows the logic operation results of the adaptive switch circuits as determined by the switch determining circuit 2011, and FIG. 11B shows the logic operation results of switch determining circuit 2012. FIG. 11A illustrates that signal i is determined based on the combination of signals d, e, f, and g in FIG. 10. It also shows that signal i will be either signal c or (c−a)/2 depending on the combination of signals d, e, f, and g. FIG. 11B illustrates that signal h is determined based on the combination of signals d and f in FIG. 10. It also shows that signal h will be either signal c or (c−a)/2 depending on the combination of signals d and f.

In FIG. 10, signal a is the output signal of the band-pass filter circuit 2002, signal b is the output signal 2104 of the inverter 2010, signal c is the output signal 2109 of the band-pass filter circuit 2003, signal (c−a)/2 is the output signal 2110 of the amplitude adjusting circuit 2009, signal d is the output signal 2105 of the C-correlation detector 2004, signal e is the output signal 2106 of the Y-correlation detector 2005, signal f is the output signal 2108 of the delay circuit 2007, signal g is the output signal 2107 of the delay circuit 2006, signal h is the output signal 2111 of the switch circuit 2013, signal i is the output signal 2112 of the switch circuit 2015, signal j is the output signal 2113 of the 3-line-comb operational circuit 2016, and signal k is the luminance signal output 2102.

First, signals indicated as signal h and i in FIG. 10 are output based on the output of signals d, e, f, and g in FIG. 10 and according to the logic operation table in FIGS. 11A and 11B. Next, signals are input to each input terminal of the 3-line-comb operational circuit 2016 illustrated in FIG. 7. Specifically, signal b in FIG. 10 is input to the input terminal 714; signal h in FIG. 10 is input to the input terminal 715; and signal i in FIG. 10 is input to the input terminal 716. The output signal for (n+4)H of the 3-line-comb operational circuit 2016 will be signal j in FIG. 10. This is one-half the amplitude of the waveform of (c−a) in FIG. 10 The luminance signal output is obtained by subtracting signal j from signal c in FIG. 10, creating the waveform of signal k in FIG. 10.

Although the waveform is different from that of signal i in FIG. 15, the optimal luminance signal output, and signal j in FIG. 15, the optimal chroma signal output, it will be apparent that the present invention reduces the chroma signal to one-half the amplitude found in conventional circuits where there should be no color on the screen. In other words, the present invention is capable of reducing color where there should be no color when separating the YC of patterns which were previously not separable using conventional YC separation devices. Furthermore, the second exemplary embodiment realizes a more compact circuitry than the first exemplary embodiment.

Third Exemplary Embodiment

A third exemplary embodiment of the present invention is explained with reference to FIG. 3, FIG. 7, FIG. 11A, FIG. 11B, FIG. 12 and FIG. 16.

Figure 3:
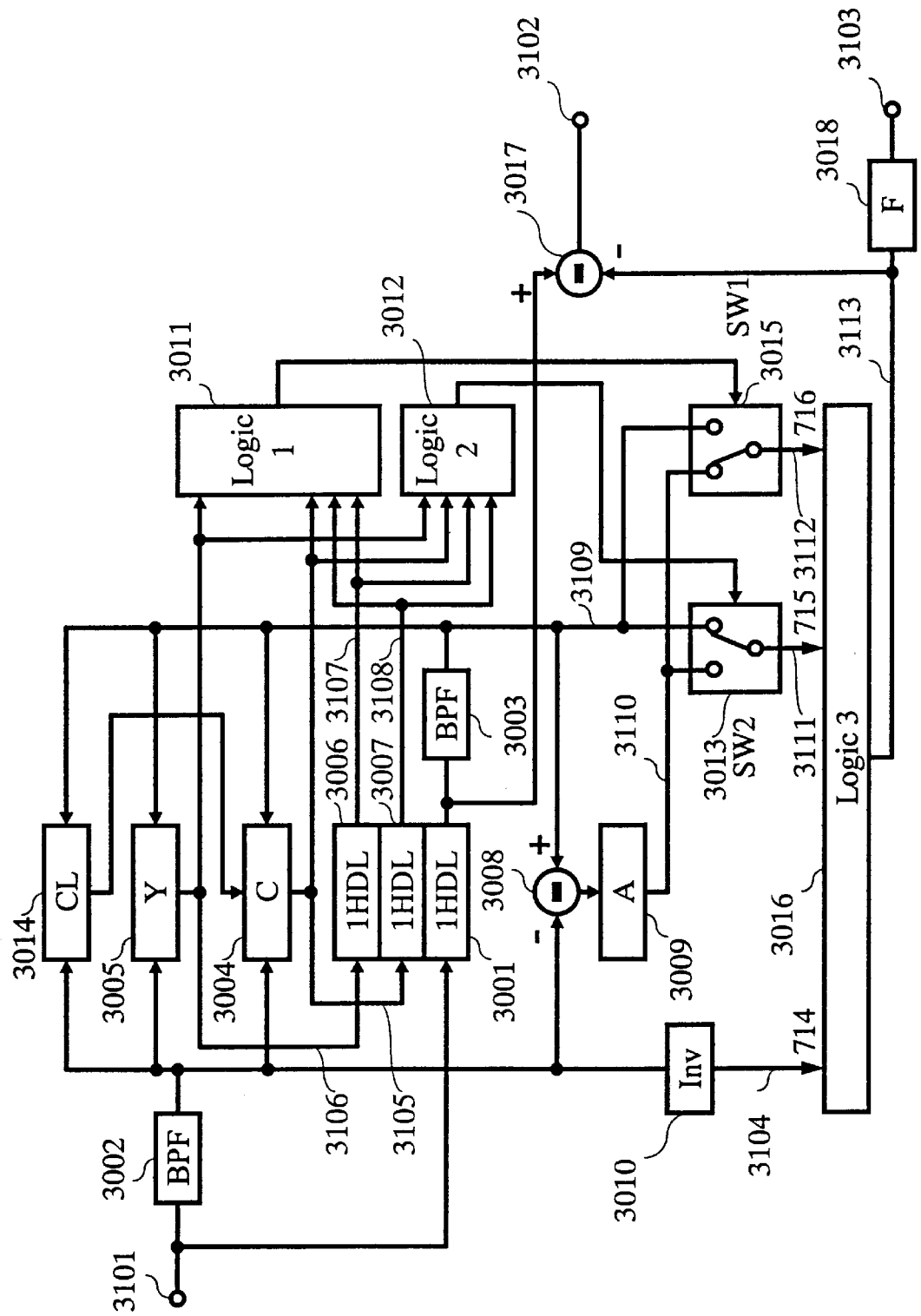
FIG. 3 is a block diagram of a 2-line YC separation device in a third exemplary embodiment of the present invention.

In FIG. 3, reference numeral 3001 is a delay circuit (1HDL) for delaying the input video signal for horizontal scanning time; 3002 is a band-pass filter circuit (BPF) whose input is the input video signal; 3003 is a band-pass filter circuit (BPF) whose input is the output signal of the delay circuit 3001; 3014 is a C-level detector (CL) whose input is the output signal of the band-pass filter circuit 3002 and the output signal of the band-pass filter circuit 3003; 3004 is a C-correlation detector (C) whose input is the output signal of the band-pass filter circuits 3002 and 3003 and the output of the C-level detector 3014; 3005 is a Y-correlation detector (Y) whose input is the output signals of the band-pass filter circuits 3002 and 3003; 3006 is a delay circuit (1HDL) for delaying the output signal of the Y-correlation detector 3005 for horizontal scanning time; 3007 is a delay circuit (1HDL) for delaying the output signal of the C-correlation detector 3004 for horizontal scanning time; 3008 is a subtractor whose input is the output signals of the band-pass filter circuits 3002 and 3003; 3009 is an amplitude adjusting circuit (A) which reduces the output signal of the subtractor 3008 by one-half; 3010 is an inverter (Inv) whose input is the output signal of the band-pass filter circuit 3002; 3011 is a switch determining circuit (Logic 1) whose input is the output signal of the Y-correlation detector 3005, the output signal of the C-correlation detector 3004, and the output signals of the delay circuits 3006 and 3007; 3012 is a switch determining circuit (Logic 2) whose input is the output signal of the Y-correlation detector 3005, the output signal of the C-correlation detector 3004, and the output of the delay circuits 3006 and 3007; 3013 is a switch circuit (SW2) whose input is the output signal of the amplitude adjusting circuit 3009 and the output signal of the band-pass filter circuit 3003; 3015 is a switch circuit (SW1) whose input is the output signal of the amplitude adjusting circuit 3009 and the output signal of the band-pass filter circuit 3003; 3016 is a 3-line-comb operational circuit (Logic 3) whose input is the output signal of the inverter 3010, the output signal of the switch circuit 3013, and the output signal of the switch circuit 3015; 3017 is a subtractor whose input is the output signal of the delay circuit 3001 and the output signal of the 3-line-comb operational circuit 3016; 3018 is a filter circuit (F) whose input is the output signal of the 3-line-comb operational circuit 3016; 3101 is the input video signal; 3102 is the luminance signal output; 3103 is the chroma signal output; 3104 is the output signal of the inverter 3010; 3105 is the output signal of the C-correlation detector; 3106 is the output signal of the Y-correlation detector; 3107 is the output signal of the delay circuit 3006; 3108 is the output signal of the delay circuit 3007; 3109 is the output signal of the band-pass filter circuit 3003; 3110 is the output signal of the amplitude adjusting circuit 3009; 3111 is the output signal of the switch circuit 3013; 3112 is the output signal of the switch circuit 3015; and 3113 is the output signal of the 3-line-comb operational circuit 3016.

Operation of a 2-line YC separation device configured as above is outlined next. Operation details follow with reference to FIG. 12.

The band-pass filter circuits 3002 and 3003 are filters which pass signals in the band centering on the frequency of the color subcarrier. The C-correlation detector 3004 is a circuit which judges a signal to be correlated when a chroma signal is input. The Y-correlation detector 3005 is a circuit which judges a signal to be correlated when a luminance signal is input. The C-level detector 3014 is a circuit which detects the level of chroma signal.

The delay circuit 3006 delays a one-bit signal, the output signal of the Y-correlation detector 3005, for one horizontal scanning interval The delay circuit 3007 delays a one-bit signal, the output signal of the C-correlation detector 3004, for one horizontal scanning interval. The switch determining circuit 3011 conducts a logic operation on the output signals of the C-correlation detectors 3004 and the Y-correlation detector 3005 and the output signals of the delay circuits 3006 and 3007, and generates a control signal for switching switch circuit 3015. The switch determining circuit 3012 conducts a logic operation on the output signals of the C-correlation detector 3004 and Y-correlation detector 3005 and the output signals of the delay circuits 3006 and 3007, and generates a control signal for switching switch circuit 3013.

The switch circuits 3013 and 3015 form an adaptive comb-line filter. The switch circuit 3013 switches between the output signal 3110 of the amplitude adjusting circuit 3009 and the output signal 3109 of the band-pass filter circuit 3003. Switch circuit 3015 switches between the output signal 3110 of the amplitude adjusting circuit 3009 and the output signal 3109 of the band-pass filter circuit 3003. The C-level detector 3014 detects the level of the chroma signal. FIG. 7 illustrates the 3-line-comb operational circuit 3016. It is a filter originally developed for 3-line-comb operational circuits. In the present invention, the output signal 3112 of the switch circuit 3015 is input to an input terminal 716, the output signal 3111 of the switch circuit 3013 is input to an input terminal 715, and the output signal 3104 of the inverter 3010 is input to an input terminal 714.

The subtractor 3017 subtracts the output signal of the 3-line-comb operational circuit 3016 from the output signal of the delay circuit 3001, and generates the luminance signal output 3102. The filter circuit 3018 filters the output signal of the 3-line-comb operational circuit 3016, and generates the chroma signal output 3103.

Figure 12:
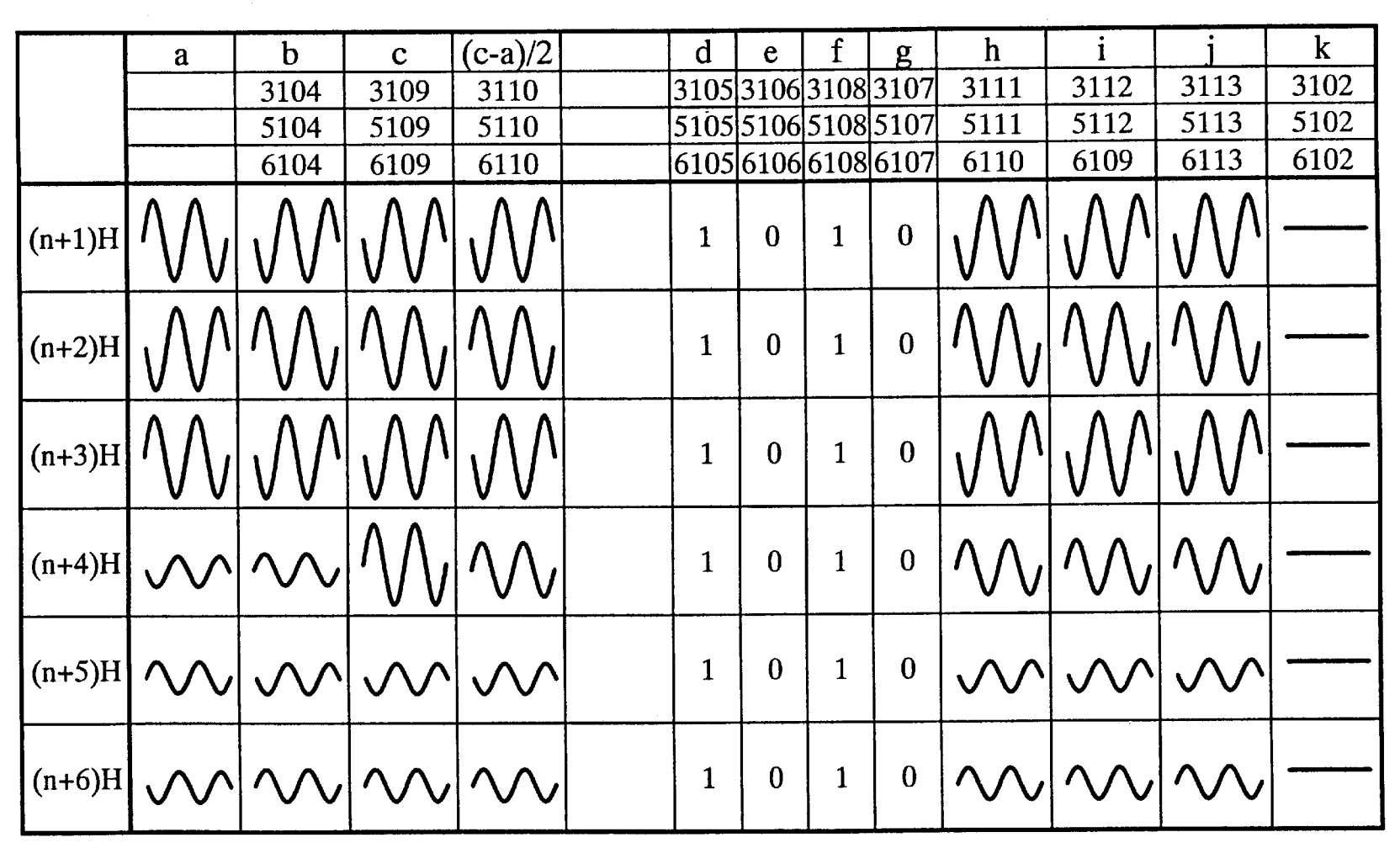

Next, operation of the exemplary embodiment is explained with reference to FIG. 12. FIG. 12 illustrates the waveform at each part when the pattern of signal a in FIG. 16, the prior art, is input to the present invention. In FIG. 12, signal a is the output signal of the band-pass filter circuit 3002, signal b is the output signal 3104 of the inverter 3010, signal c is the output signal 3109 of the band-pass filter circuit 3003, signal (c−a)/2 is the output signal 3110 of the amplitude adjusting circuit 3009, signal d is the output signal 3105 of the C-correlation detector 3004, signal e is the output signal 3106 of the Y-correlation detector 3005, signal f is the output signal 3108 of the delay circuit 3007, signal g is the output signal 3107 of the delay circuit 3006, signal h is the output signal 3111 of the switch circuit 3013, signal i is the output signal 3112 of the switch circuit 3015, signal j is the output signal 3113 of the 3-line-comb operational circuit 3016, and signal k is the luminance signal output 3102.

First, signals indicated as signal h and i in FIG. 12 are output based on the output of signals d, e, f, and g in FIG. 12 and the logic operation table in FIGS. 11A and 11B. Next, signals are input to each input terminal of the 3-line-comb operational circuit 3016 illustrated in FIG. 7. Specifically, signal b in FIG. 12, is input to the input terminal 714; signal h in FIG. 12 is input to the input terminal 715; and signal i in FIG. 12 is input to the input terminal 716. The luminance signal output is obtained by subtracting signal j from signal c in FIG. 12, creating the waveform of signal k in FIG. 12.

Figure 16:
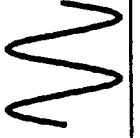
FIG. 16 is an explanatory drawing of a second operation of the conventional 2-line YC separation device.

It will be apparent that the present invention, as described above, achieves the same waveform as that of signal i in FIG. 16, the optimal luminance signal output, and signal j in FIG. 16, the optimal chroma signal output. In other words, the present invention is capable of completely separating the YC of patterns which were previously not separable using conventional YC separation devices Fourth Exemplary Embodiment A fourth exemplary embodiment of the present invention is explained with reference to FIG. 4, FIG. 7, FIG. 11A, FIG. 11B, FIG. 13 and FIG. 17.

Figure 4:
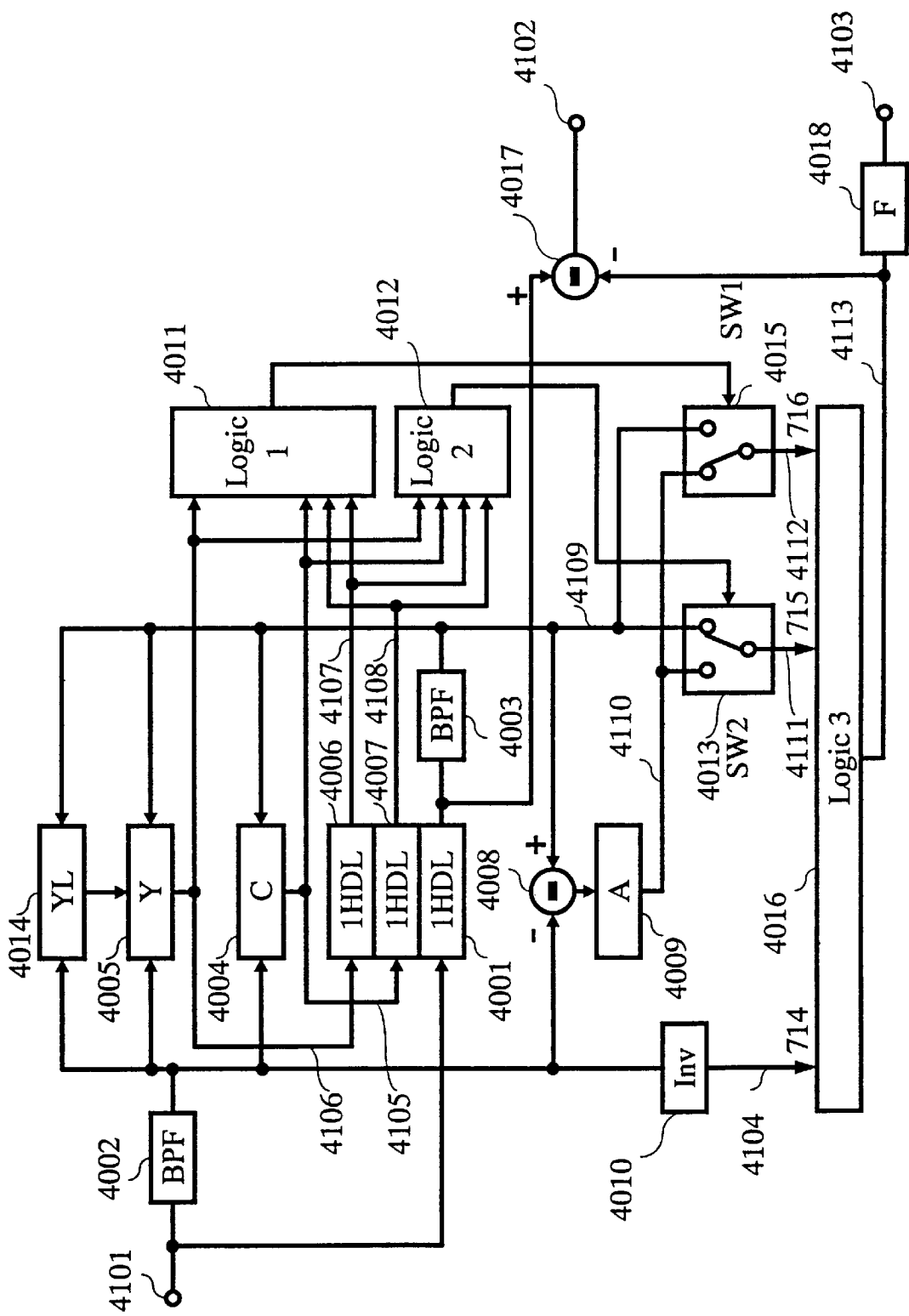
FIG. 4 is a block diagram of a two-line YC separation device in a fourth exemplary embodiment of the present invention.

In FIG. 4, only difference in configuration from the third exemplary embodiment is a Y-level detector 4014, provided instead of the C-level detector 3014.

Since the rest of the configuration is same as the third exemplary embodiment, description of the configuration is omitted.

Operation of a 2-line YC separation device configured as above is outlined below. Operational details follow with reference to FIG. 13.

The band-pass filter circuits 4002 and 4003 are filters which pass signals in the band centering on the frequency of the color subcarrier. The C-correlation detector 4004 is a circuit which judges a signal to be correlated when a chroma signal is input. The Y-correlation detector 4005 is a circuit which judges a signal to be correlated when a luminance signal is input. The Y-level detector 4014 is a circuit which detects the level of luminance signal.

The delay circuit 4006 delays a one-bit signal, the output signal of the Y-correlation detector 4005, for one horizontal scanning interval. The delay circuit 4007 delays a one-bit signal, the output signal of the C-correlation detector 4004, for one horizontal scanning interval. The switch determining circuit 4011 conducts a logic operation on the output signals of the C-correlation detector 4004 and the Y-correlation detector 4005 and the output signals of the delay circuits 4006 and 4007, and generates a control signal for switching switch circuit 4015. The switch determining circuit 4012 conducts a logic operation on the output signals of the C-correlation detector 4004 and the Y-correlation detector 4005 and the output signals of the delay circuits 4006 and 4007, and generates a control signal for switching switch circuit 4013.

The switch circuits 4013 and 4015 form an adaptive comb-line filter. The switch circuit 4013 switches between the output signal 4110 of the amplitude adjusting circuit 4009 and the output signal 4109 of the band-pass filter circuit. Switch circuit 4015 switches between the output signal 4110 of the amplitude adjusting circuit 4009 and the output signal 4109 of the band-pass filter circuit 4003. The Y-level detector 4014 detects the level of luminance signal. FIG. 7 illustrates the 3-line-comb operational circuit 4016 (Logic 3). It is a filter originally developed for 3-line-comb operational circuits, and in the present invention, the output signal 4112 of the switch circuit 4015 is input to an input terminal 716, the output signal 4111 of the switch circuit 4013 is input to an input terminal 715, and the output signal 4104 of the inverter 4010 is input to an input terminal 714.

The subtractor 4017 subtracts the output signal 4113 of the 3-line-comb operational circuit 4016 from the output signal of the delay circuit 4001, and generates the luminance signal output 4102. The filter circuit 4018 filters the output signal 4113 of the 3-line-comb operational circuit 4016, and generates the chroma signal output 4103.

Next, operation of the exemplary embodiment is explained with reference to FIG. 13.

Figure 17:
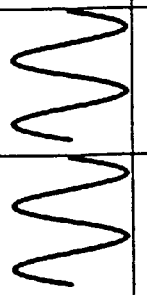
FIG. 17 is an explanatory drawing of a third operation of the conventional 2-line YC separation device.

FIG. 13 illustrates the waveform at each part when the pattern of signal a in FIG. 17, the prior art, is input to the present invention. In FIG. 13, signal a is the output signal of the band-pass filter circuit 4002, signal b is the output signal 4104 of the inverter 4010, signal c is the output signal 4109 of the band-pass filter circuit 4003, signal (c−a)/2 is the output signal 4110 of the amplitude adjusting circuit 4009, signal d is the output signal 4105 of the C-correlation detector 4004, signal e is the output signal 4106 of the Y-correlation detector 4005, signal f is the output signal 4108 of the delay circuit 4007, signal g is the output signal 4107 of the delay circuit 4006, signal h is the output signal 4111 of the switch circuit 4013, signal i is the output signal 4112 of the switch circuit 4015, signal j is the output signal 4113 of the 3-line-comb operational circuit 4016, and signal k is the luminance signal output 4102.

First, signals indicated as signal h and i in FIG. 13 are output based on the output of signals d, e, f, and g in FIG. 13 and according to the logic operation table in FIGS. 11A and 11B. Next, signals are input to each input terminal of the 3-line-comb operational circuit 4016 illustrated in FIG. 7. Specifically, signal b in FIG. 13, is input to the input terminal 714; signal h in FIG. 13 is input to the input terminal 715; and signal i in FIG. 13 is input to the input terminal 716. The luminance signal output is obtained by subtracting signal j from signal c in FIG. 13, creating the waveform of signal k in FIG. 13. Signal k for (n+4)H in FIG. 13 is one-half the amplitude of the waveform (c–a) in FIG. 13.

Although the waveform is different from that of signal i in FIG. 17, the optimal luminance signal output, and signal j in FIG. 17, the optimal chroma signal output, the present invention reduces the luminance component to half that found in conventional circuits where there should be color on the screen. In other words, the present invention is capable of reducing the luminance component where there should be color when separating the YC of patterns which were previously not separable using conventional YC separation devices.

Fifth Exemplary Embodiment

A fifth exemplary embodiment of the present invention is explained with reference to FIG. 5, FIG. 7, FIG. 11A, FIG. 11B, FIG. 12, FIG. 13, FIG. 16, and FIG. 17.

Figure 5:
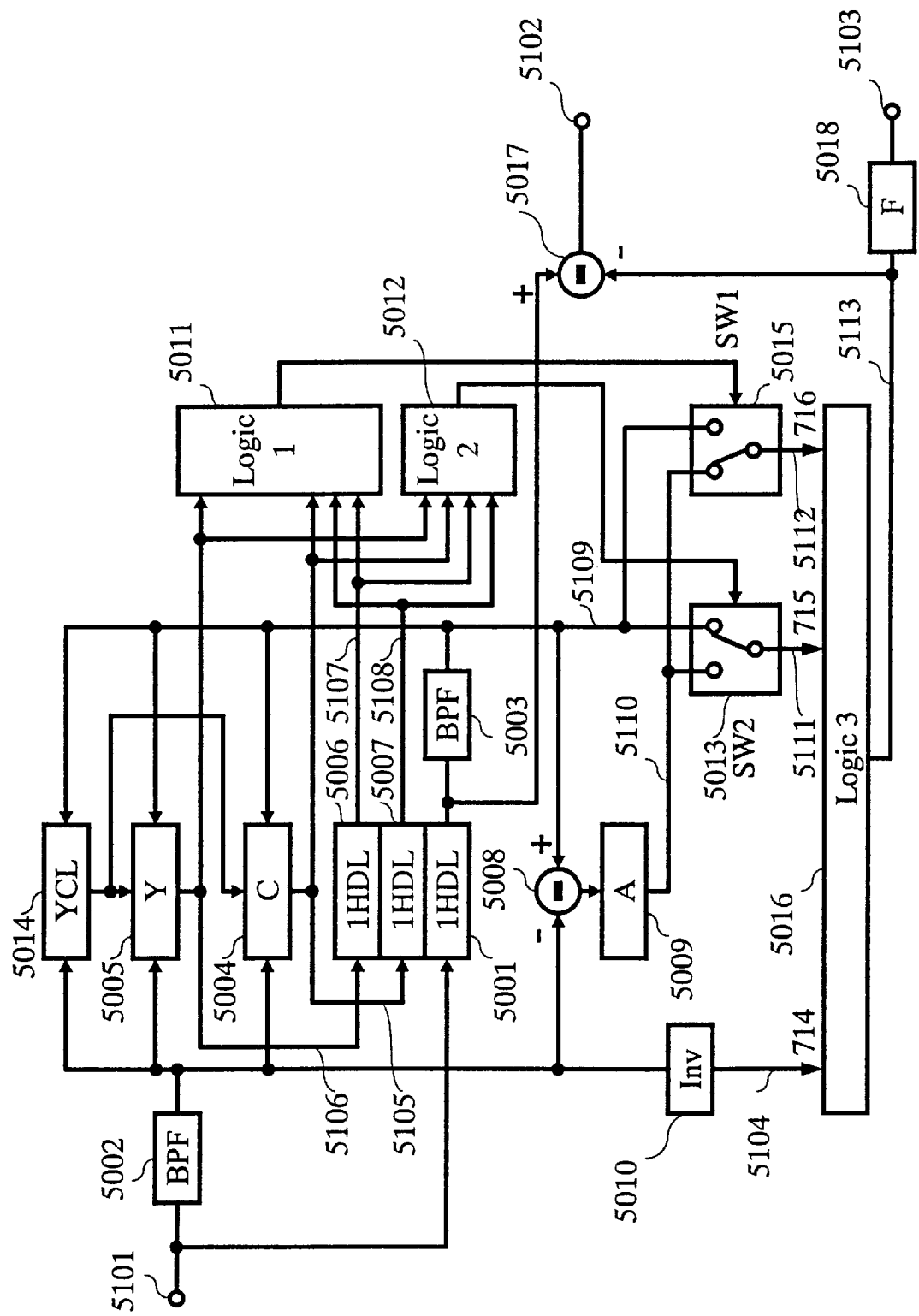
FIG. 5 is a block diagram of a 2-line YC separation device in a fifth exemplary embodiment of the present invention.

In FIG. 5, the only difference in the configuration from the third exemplary embodiment is a YC-level detector (YCL) 5014, provided instead of the C-level detector 3014.

Since the rest of the configuration is the same as the third exemplary embodiment, description of the configuration is omitted.

Operation of a 2-line YC separation device configured as above is outlined below. Operational details follow with reference to FIGS. 12 and 13.

The band-pass filter circuits 5002 and 5003 are filters which pass signals in the band centering on the frequency of the color subcarrier. The C-correlation detector 5004 is a circuit which judges a signal to be correlated when a chroma signal is input. The Y-correlation detector 5005 is a circuit which judges a signal to be correlated when a luminance signal is input. The YC-level detector 5014 is a circuit which detects the level of chroma signal and luminance signal.

The delay circuit 5006 delays a one-bit signal, the output signal of the Y-correlation detector 5005, for one horizontal scanning interval. The delay circuit 5007 delays a one-bit signal, the output signal of the C-correlation detector 5004, for one horizontal scanning interval. The switch determining circuit 5011 conducts a logic operation on the output signals of the C-correlation detectors 5004 and the Y-correlation detector 5005 and the output signals of the delay circuits 5006 and 5007, and generates a control signal for switching switch circuit 5015. The switch determining circuit 5012 conducts a logic operation on the output signals of the C-correlation detector 5004 and Y-correlation detector 5005 and the output signals of the delay circuits 5006 and 5007, and generates a control signal for switching switch circuit 5013.

The switch circuits 5013 and 5015 form an adaptive comb-line filter. The switch circuit 5013 switches between the output signal 5110 of the amplitude adjusting circuit 5009 and the output signal 5109 of the band-pass filter circuit. Switch circuit 5015 switches between the output signal 5110 of the amplitude adjusting circuit 5009 and the output signal 5109 of the band-pass filter circuit 5003. The YC-level detector 5014 detects the level of luminance signal and chroma signal. FIG. 7 illustrates the 3-line-comb operational circuit 5016 (Logic 3). It is a filter originally developed for 3-line-comb operational circuits, and in the present invention, the output signal 5112 of the switch circuit 5015 is input to an input terminal 716, the output signal 5111 of the switch circuit 5013 is input to an input terminal 715, and the output signal 5104 of the inverter 5010 is input to an input terminal 714.

The subtractor 5017 subtracts the output signal 5113 of the 3-line-comb operational circuit 5016 from the output signal of the delay circuit 5001, and generates the luminance signal output 5102. The filter circuit 5018 filters the output signal 5113 of the 3-line-comb operational circuit 5016, and generates the chroma signal output 5103.

Next, operation of the exemplary embodiment is explained with reference to FIG. 12.

FIG. 12 illustrates the waveform at each part when the pattern of signal a in FIG. 16, the prior art, is input to the present invention. In FIG. 12, signal a is the output signal of the band-pass filter circuit 5002, signal b is the output signal 5104 of the inverter 5010, signal c is the output signal 5109 of the band-pass filter circuit 5003, signal (c–a)/2 is the output signal 5110 of the amplitude adjusting circuit 5009, signal d is the output signal 5105 of the C-correlation detector 5004, signal e is the output signal 5106 of the Y-correlation detector 5005, signal f is the output signal 5108 of the delay circuit 5007, signal g is the output signal 5107 of the delay circuit 5006, signal h is the output signal 5111 of the switch circuit 5013, signal i is the output signal 5112 of the switch circuit 5015, signal j is the output signal 5113 of the 3-line-comb operational circuit 5016, and signal k is the luminance signal output 5102.

First, signals indicated as signal h and i in FIG. 12 are output based on the output of signals d, e, f, and g in FIG. 12 and according to the logic operation table in FIGS. 11A and 11B. Next, signals are input to each input terminal of the 3-line-comb operational circuit 5016 illustrated in FIG. 7. Specifically, signal b in FIG. 12, is input to the input terminal 714; signal h in FIG. 12 is input to the input terminal 715; and signal i in FIG. 12 is input to the input terminal 716. The luminance signal output is obtained by subtracting signal j from signal c in FIG. 12, creating the waveform of signal k in FIG. 12. It will be apparent that the present invention achieves the same waveform as that of signal i in FIG. 16, the optimal luminance output, and signal j in FIG. 16, the optimal chroma signal.

FIG. 13 also illustrates the waveform at each part when the pattern of signal a in FIG. 17 is input to the present invention. Description of signals a to k is omitted here, since it is same as that of FIG. 12.

First, signals indicated as signal h and i in FIG. 13 are output based on the output of signals d, e, f, and g in FIG. 13 and according to the logic operation table in FIGS. 11A and 11B. Next, signals are input to each input terminal of the 3-line-comb operational circuit 5016 illustrated in FIG. 7. Specifically, signal b in FIG. 13, is input to the input terminal 714; signal h in FIG. 13 is input to the input terminal 715; and signal i in FIG. 13 is input to the input terminal 716. The output signal of the 3-line-comb operational circuit will be the waveform of signal j in FIG. 13. The luminance signal output k is obtained by subtracting signal j from signal c in FIG. 13, creating the waveform of signal k in FIG. 13. The waveform of signal k for (n+4)H is one-half the amplitude of the waveform (c–a) in FIG. 13.

Although the waveform is different from that of signal i in FIG. 17, the optimal luminance signal output, and signal j in FIG. 17, the optimal chroma signal output, the present invention reduces the luminance component to one-half the amplitude found in conventional circuits where there should be color on the screen. In other words, the present invention is capable of accurately separating the YC of patterns which were previously not separable using conventional YC separation devices.

Sixth Exemplary Embodiment

A sixth exemplary embodiment of the present invention is explained with reference to FIG. 6, FIG. 12, FIG. 13, FIG. 16, and FIG. 17.

Figure 6:
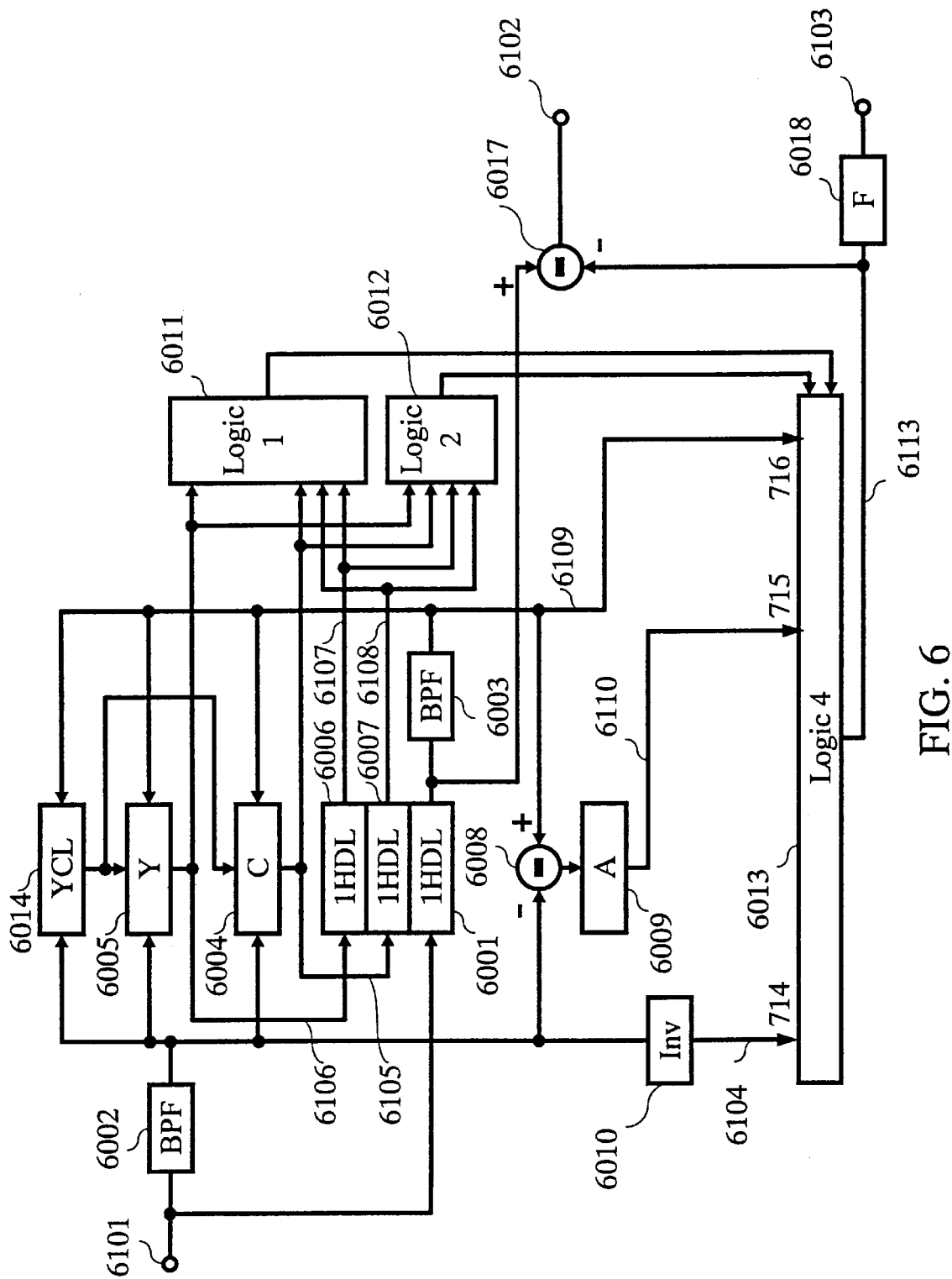
FIG. 6 is a block diagram of a 2-line YC separation device in a sixth exemplary embodiment of the present invention.

In FIG. 6, reference numeral 6001 is a delay circuit (1HDL) for delaying the input video signal for horizontal scanning time; 6002 is a band-pass filter circuit (BPF) whose input is the input video signal; 6003 is a band-pass filter circuit (BPF) whose input is the output signal of the delay circuit 6001; 6014 is a YC-level detector (YCL) whose input is the output signal of the band-pass filter circuit 6002 and the output signal of the band-pass filter circuit 6003; 6004 is a C-correlation detector (C) whose input is the output signals of the band-pass filter circuits 6002 and 6003 and the output of the YC-level detector 6014; 6005 is a Y-correlation detector (Y) whose input is the output signals of the band-pass filter circuits 6002 and 6003; 6006 is a delay circuit (1HDL) for delaying the output signal of the Y-correlation detector 6005 for horizontal scanning time; 6007 is a delay circuit (1HDL) for delaying the output signal of the C-correlation detector 6004 for horizontal scanning time; 6008 is a subtractor whose input is the output signals of the band-pass filter circuits 6002 and 6003; 6009 is an amplitude adjusting circuit (A) which reduces the output signal of the subtractor 6008 to half; 6010 is an inverter (Inv) whose input is the output signal of the band-pass filter circuit 6002; 6011 is a switch determining circuit (Logic 1) whose input is the output signal of the Y-correlation detector 6005, the output signal of the C-correlation detector 6004, and the output of the delay circuits 6006 and 6007; 6012 is a switch determining circuit (Logic 2) whose input is the output signal of the Y-correlation detector 6005, the output signal of the C-correlation detector 6004, and the output of the delay circuits 6006 and 6007; 6013 is a selector (Logic 4) whose input is the output signal of the inverter 6010, the output signal of the amplitude adjusting circuit 6009 and the output signal of the band-pass filter circuit 6003; 6017 is a subtractor whose input is the output signal of the delay circuit 6001 and the output signal 6113 of the selector 6013; 6018 is a filter circuit whose input is the output signal of the selector 6013; 6101 is the input video signal; 6102 is the luminance signal output; 6103 is the chroma signal output; 6104 is the output signal of the inverter 6010; 6105 is the output signal of the C-correlation detector; 6106 is the output signal of the Y-correlation detector; 6107 is the output signal of the delay circuit 6006; 6108 is the output signal of the delay circuit 6007; 6109 is the output signal of the band-pass filter circuit 6003; 6110 is the output signal of the amplitude adjusting circuit 6009; and 6113 is the output signal of the selector 6013.

Operation of a 2-line YC separation device configured as above is outlined next.

The band-pass filter circuits 6002 and 6003 are filters which pass signals in the band centering on the frequency of the color subcarrier. The C-correlation detector 6004 is a circuit which judges a signal to be correlated when a chroma signal is input. The Y-correlation detector 6005 is a circuit which judges a signal to be correlated when a luminance signal is input. The YC-level detector 6014 is a circuit which detects the level of chroma signal and luminance signal.

The delay circuit 6006 delays a one-bit signal, the output signal of the Y-correlation detector 6005, for one horizontal scanning interval. The delay circuit 6007 delays a one-bit signal, the output signal of the C-correlation detector 6004, for one horizontal scanning interval. The switch determining circuit 6011 conducts a logic operation on the output signals of the C-correlation detector 6004 and the Y-correlation detector 6005 and the output signals of the delay circuits 6006 and 6007, and generates a control signal for switching selector 6013. The switch determining circuit 6012 conducts a logic operation on the output signals of the C-correlation detector 6004, the Y-correlation detector 6005 and the output signals of the delay circuits 6006 and 6007, and generates a control signal for switching selector 6013.

The selector 6013 forms an adaptive comb-line filter, and switches between the output signal 6104 of the inverter 6010, the output signal 6110 of the amplitude adjusting circuit 6009, and the output signal 6109 of the band-pass filter, depending on the output signals of the switch determining circuit 6011 and the switch determining circuit 6012. The YC-level detector 6014 detects the level of chroma signal and luminance signal.

The subtractor 6017 subtracts the output signal of the selector 6013 from the output signal of the delay circuit 6001, and generates the luminance signal output 6102. The filter circuit 6018 filters the output signal of the selector 6013, and generates the chroma signal output 6103.

Next, operation of the exemplary embodiment is explained with reference to FIG. 12.

FIG. 12 illustrates the waveform at each part when the pattern of signal a in FIG. 16, the prior art, is input to the present invention. In FIG. 12, signal a is the output signal of the band-pass filter circuit 6002, signal b is the output signal 6104 of the inverter 6010, signal c is the output signal 6109 of the band-pass filter circuit 6003, signal (c−a)/2 is the output signal 6110 of the amplitude adjusting circuit 6009, signal d is the output signal 6105 of the C-correlation detector 6004, signal e is the output signal 6106 of the Y-correlation detector 6005, signal f is the output signal 6108 of the delay circuit 6007, signal g is the output signal 6107 of the delay circuit 6006, signal h is the output signal 6110 of the amplitude adjusting circuit 6009, signal i is the output signal 6109 of the band-pass filter 6003, signal j is the output signal 6113 of the selector 6013, and signal k is the luminance signal output 6102.

The output signal of the selector 6013 will be the waveform of signal j in FIG. 12 based on the combination of signals indicated as signals d, e, f, and g in FIG. 12. The luminance signal output is obtained by subtracting signal j from signal c in FIG. 12, creating the waveform of signal k in FIG. 12. The waveform is identical to the waveform of signal i in FIG. 16, the optimal luminance signal output, and signal j in FIG. 16, the optimal chroma signal output.

FIG. 13 also illustrates the waveform at each part when the pattern of signal a in FIG. 17, the prior art, is input to the present invention. In FIG. 13, signal a is the output signal of the band-pass filter circuit 6002, signal b is the output signal 6104 of the inverter 6010, signal c is the output signal 6109 of the band-pass filter circuit 6003, signal d is the output signal 6105 of the C-correlation detector 6004, signal e is the output signal 6106 of the Y-correlation detector 6005, signal f is the output signal 6108 of the delay circuit 6007, signal g is the output signal 6107 of the delay circuit 6006, signal j is the output signal 6113 of the selector 6013, and signal k is the luminance signal output 6102.

The output signal of the selector 6013 will be the waveform of signal j in FIG. 13 based on the combination of signals indicated as signals d, e, f, and g in FIG. 13. The luminance signal output is obtained by subtracting signal j from signal c in FIG. 12, creating the waveform of signal k in FIG. 13. The waveform of signal k in FIG. 13 is a one-half the amplitude of the waveform of (c−a) in FIG. 13.

Although the waveform is different from that of signal i in FIG. 17, the optimal luminance signal output, and signal j in FIG. 17, the optimal chroma signal output, the present invention reduces the luminance component to half that found in conventional circuits where there should be color on the screen. In other words, the present invention is capable of accurately separating the YC of patterns which were previously not separable using conventional YC separation devices.

As described above, it will be obvious that the first exemplary embodiment of the present invention outputs the same waveform as that of signal i in FIG. 15, the optimal luminance signal output, and signal j in FIG. 15, the optimal chroma signal output. In other words, the present invention is capable of completely separating the YC of patterns which were previously not separable using conventional YC separation devices.

The second exemplary embodiment of the present invention reduces the chroma signal to one-half the amplitude found in conventional circuits where there should be no color on the screen, although the waveform is different from that of signal i in FIG. 15, the optimal luminance signal output, and signal j in FIG. 15, the optimal chroma signal output. In other words, the present invention is capable of reducing color where there should be no color when separating the YC of patterns which were previously not separable using conventional YC separation devices. Furthermore, the second exemplary embodiment realizes a more compact circuit than the first exemplary embodiment.

The third exemplary embodiment outputs the same waveform as that of signal i in FIG. 16, the optimal luminance signal output, and signal j in FIG. 16, the optimal chroma signal output. In other words, the present invention is capable of completely separating the YC of patterns which were previously not separable using conventional YC separation devices.

The fourth exemplary embodiment of the present invention reduces the luminance component to one-half the amplitude found in conventional circuits where there should be color on the screen, although the waveform is different from that of signal i in FIG. 17, the optimal luminance signal output, and signal j in FIG. 17, the optimal chroma signal output In other words, the present invention is capable of reducing the luminance component where there should be color when separating the YC of patterns which were previously not separable using conventional YC separation devices.

The fifth exemplary embodiment of the present invention reduces the luminance component to one-half the amplitude found in conventional circuits where there should be color on the screen, although the waveform is different from that of signal i in FIG. 17, the optimal luminance signal output, and signal j in FIG. 17, the optimal chroma signal output. In other words, the present invention is capable of accurately separating the YC of patterns which were previously not separable using conventional YC separation devices.

The sixth exemplary embodiment of the present invention reduces the luminance component to one-half the amplitude found in conventional circuits where there should be color on the screen, although the waveform is different from that of signal i in FIG. 17, the optimal luminance signal output, and signal j in FIG. 17, the optimal chroma signal output. In other words, the present invention is capable of accurately separating the YC of patterns which were previously not separable using conventional YC separation devices.

It should be noted that, in exemplary embodiments from 1 to 6, the time of horizontal scanning delay is not limited to one horizontal scanning interval. For example, the time of horizontal scanning delay can be two horizontal scanning intervals It will be appreciated that modifications may be made in the present invention. The preferred embodiments described herein are therefore illustrative and not restrictive, the scope of the invention being indicated by the appended claims, and all modifications which come within the true spirit of the claims are intended to be embraced therein.

What is claimed is:

1. A 2-line YC separation device for use with an input video signal comprising:

a filter for filtering the input video signal and generating a filtered input video signal;

a correlator for correlating the filtered input video signal;

a determiner for generating a plurality of switch control signals based on the output from said correlator; and a logic circuit for generating an output based on an output from said filter responsive to said plurality of switch control signals from said determiner.

2. A 2-line YC separation device of claim 1, further comprising:

a first delay circuit for delaying the input video signal for a horizontal scanning period and generating a delayed input video signal; and a second filter coupled to the first delay circuit;

wherein said second filter further filters the delayed input video signal and generates a filtered delayed input video signal and said correlator correlates the filtered input video signal and the filtered delayed input video signal.

3. A 2-line YC separation device of claim 2, further comprising:

an amplitude adjuster for adjusting the amplitude of the filtered input video signal and the filtered delayed input video signal;

wherein said logic circuit generates the output based on an output from said amplitude adjuster, and said second filter responsive to said plurality of switch control signals from said determiner.

4. A 2-line YC separation device of claim 3, further comprising:

a second delay circuit for delaying the output of said correlator by the horizontal scanning period; and an inverter for inverting the filtered input video signal;

wherein said determiner generates said plurality of switch control signals based on the output from said correlator and an output from said second delay circuit and said logic circuit generates the output based on the output from said amplitude adjuster, said second filter, and said inverter responsive to said plurality of switch control signals from said determiner.

5. A 2-line YC separation device for use with an input video signal according to claim 1, wherein said logic circuit comprises a 3-line-comb operational circuit.

6. A 2-line YC separation device for use with an input video signal according to claim 1, wherein said logic circuit comprises a selector.

7. A 2-line YC separation device according to claim 1, further comprising:

a first delay circuit for delaying the input video signal for a horizontal scanning period;

said filter includes i) a first band-pass filter for filtering the input video signal and producing the filtered input video signal and ii) a second-band pass filter for filtering an output signal of said first delay circuit;

said correlator includes i) a Y-correlation detector for correlating luminance outputs from said first band-pass filter and said second band-pass filter and ii) a C-correlation detector for correlating chrominance outputs from said first band-pass filter and said second band-pass filter;

a second delay circuit for delaying an output signal of said Y-correlation detector for said horizontal scanning period;

a third delay circuit for delaying an output signal of said C-correlation detector for said horizontal scanning period;

a first inverter for inverting the filtered input video signal from said first band-pass filter;

a first subtractor for subtracting the filtered video input signals of said first and second band-pass filters;

an amplitude adjusting circuit for adjusting an amplitude of an output of said first subtractor;

said determiner includes
 a) a first switch determining circuit for selecting a first switch signal based on the output signals of i) said Y-correlation detector, ii) said C-correlation detector, iii) said second delay circuit and iv) said third delay circuit; and
 b) a second switch determining circuit for selecting a second switch signal based on the output signals of i) said Y-correlation detector, ii) said C-correlation detector, iii) said second delay circuit and, iv) said third delay circuit;

a second inverter for inverting the output signal of said second band-pass filter;

said logic circuit includes
 a) a first switch circuit for selecting one of i) the output signal of said amplitude adjusting circuit, ii) the output signal of said second inverter, and iii) the output signal of said second band-pass filter, responsive to the first switch signal of said first switch determining circuit;
 b) a second switch circuit for selecting one of the output signal of said amplitude adjusting circuit and the output signal of said second band-pass filter, responsive to the second switch signal of said second switch determining circuit; and
 c) a 3-line-comb operational circuit whose input is i) the output signal of said first inverter ii) an output of said first switch circuit and iii) an output of said second switch circuit;

a second subtractor for subtracting an output signal of said 3-line-comb operational circuit from the output signal of said first delay circuit; and a filter for filtering the output signal of said 3-line-comb operational circuit.

8. A 2-line YC separation device according to claim 1, further comprising:

a first delay circuit for delaying the input video signal for a horizontal scanning period;

said filter includes i) a first band-pass filter for filtering the input video signal and producing the filtered input video signal, and
ii) a second-band pass filter for filtering the output signal of said first delay circuit;

said correlator includes i) a Y-correlation detector for correlating luminance outputs from said first band-pass filter and said second band-pass filter, and ii) a C-correlation detector for correlating chrominance outputs from said first band-pass filter and said second band-pass filter;

a second delay circuit for delaying an output signal of said Y-correlation detector for said horizontal scanning period;

a third delay circuit for delaying an output signal of said C-correlation detector for said horizontal scanning period;

an inverter for inverting the filtered input video signal from said first band-pass filter;

a first subtractor for subtracting the filtered video input signals of said first and second band-pass filter;

an amplitude adjusting circuit for adjusting an amplitude of an output of said first subtractor;

said determiner includes a) a first switch determining circuit for selecting a first switch signal based on the output signals of i) said Y-correlation detector, ii) said C-correlation detector, iii) said second delay circuit and iv) said third delay circuit, and
 b) a second switch determining circuit for selecting a second switch signal based on the output signals of i) said Y-correlation detector, ii) said C-correlation detector, iii) said second delay circuit and iv) said third delay circuit;

said logic circuit includes a) a first switch circuit for selecting one of the output signal of said amplitude adjusting circuit and the output signal of said second band-pass filter, responsive to the first switch signal of the first switch determining circuit,
 b) a second switch circuit for selecting one of the output signal of said amplitude adjusting circuit and the output signal of said second band-pass filter, responsive to the second switch signal of the second switch determining circuit, and
 c) a 3-line-comb operational circuit whose input is an output of said inverter and an output of said first switch circuit and said second switch circuit;

a second subtractor for subtracting an output signal of said 3-line-comb operational circuit from the output signal of said first delay circuit; and a filter for filtering the output signal of said 3-line-comb operational circuit.

9. A 2-line YC separation device according to claim 1, further comprising:

a first delay circuit for delaying the input video signal for a horizontal scanning period;

said filter includes i) a first band-pass filter for filtering the input video signal and producing the filtered input video signal, and ii) a second-band pass filter for filtering an output signal of said first delay circuit;

a C-level detector for detecting a chrominance level in an to output of said first band-pass filter and an output of said second band-pass filter;

said correlator includes i) a Y-correlation detector for correlating luminance in the output of said first band-pass filter and the output of said second band-pass filter, and ii) a C-correlation detector for correlating chrominance in the output of said first band-pass filter and the output of said second band-pass filter and an output signal of said C-level detector;

a second delay circuit for delaying an output signal of said Y-correlation detector for the horizontal scanning period;

a third delay circuit for delaying the output signal of said C-correlation detector for the horizontal scanning period;

an inverter for inverting the filtered input video signal from said first band-pass filter;

a first subtractor for subtracting the filtered video input signals of said first and second band-pass filter;

an amplitude adjusting circuit for adjusting an amplitude of an output of said first subtractor;

said determiner includes a) a first switch determining circuit for selecting a first switch signal based on the output signals of i) said Y-correlation detector, ii) said C-correlation detector, iii) said second delay circuit and, iv) said third delay circuit, and b) a second switch determining circuit for selecting a second switch signal based on the output signals of i) said Y-correlation detector, ii) said C-correlation detector, iii) said second delay circuit and, iv) said third delay circuit;

said logic circuit includes a) a first switch circuit for selecting one of the output signal of said amplitude adjusting circuit and the output signal of said second band-pass filter, responsive to the first switch signal of said first switch determining circuit, b) a second switch circuit for selecting one of the output signal of said amplitude adjusting circuit and the output signal of said second band-pass filter, responsive to the second switch signal of the second switch determining circuit, and c) a 3-line-comb operational circuit whose input is an output of said inverter and an output of said first switch circuit and said second switch circuit;

a second subtractor for subtracting an output signal of said 3-line-comb operational circuit from the output signal of said first delay circuit; and a filter circuit for filtering the output signal of said 3-line-comb operational circuit.

10. A 2-line YC separation device according to claim 1, further comprising:

a first delay circuit for delaying the input video signal for a horizontal scanning period;

said filter includes i) a first band-pass filter for filtering the input video signal and producing the filtered input video signal, and ii) a second-band pass filter for filtering an output signal of said first delay circuit;

a Y-level detector for detecting a luminance level in an output signal of said first band-pass filter and an output signal of said second band-pass filter;

said correlator includes i) a C-correlation detector for correlating chrominance outputs from said first band-pass filter and said second band-pass filter, and ii) a Y-correlation detector for correlating luminance from the output signal of said first band-pass filter, the output signal of said second band-pass filter and an output signal of said Y-level detector;

a second delay circuit for delaying an output signal of said Y-correlation detector for said horizontal scanning period;

a third delay circuit for delaying an output signal of said C-correlation detector for said horizontal scanning period;

an inverter for inverting the filtered input video signal from the said first band-pass filter;

a first subtractor for subtracting the filtered video input signals of said first and second band-pass filter;

an amplitude adjusting circuit for adjusting an amplitude of an output of said first subtractor;

said determiner includes a) a first switch determining circuit for selecting a first switch signal based on the output signals of i) said Y-correlation detector, ii) said C-correlation detector, iii) said second delay circuit and said third delay circuit, and b) a second switch determining circuit for selecting a second switch signal based on the output signals of i) said Y-correlation detector, ii) said C-correlation detector, iii) said second delay circuit and said third delay circuit;

said logic circuit includes a) a first switch circuit for selecting one of the output signal of said amplitude adjusting circuit and the output signal of said second band-pass filter, responsive to the first switch signal of the first switch determining circuit, b) a second switch circuit for selecting one of the output signal of said amplitude adjusting circuit and the output signal of said second band-pass filter, responsive to the second switch signal of the second switch determining circuit, and c) a 3-line-comb operational circuit whose input is an output of said inverter and an output of said first switch circuit and said second switch circuit;

a second subtractor for subtracting an output signal of said 3-line-comb operational circuit from the output signal of said first delay circuit; and a filter circuit for filtering the output signal of said 3-line-comb operational circuit.

11. A 2-line YC separation device according to claim 1, further comprising:

a first delay circuit for delaying the input video signal for a horizontal scanning period;

said filter includes i) a first band-pass filter for filtering the input video signal and producing the filtered input video signal, and ii) a second-band pass filter for filtering the output signal of said first delay circuit;

a YC-level detector for detecting a YC level in the output signal of said first band-pass filter and the output signal of said second band-pass filter;

said correlator includes i) a C-correlation detector for correlating chrominance in the output signal of said first band-pass filter, the output signal of said second band-pass filter and, an output signal of said YC-level detector, and ii) a Y-correlation detector for correlating luminance in the output signal of said first band-pass filter, the output signal of said second band-pass filter, and the output signal of said YC-level detector;

a second delay circuit for delaying an output signal of said Y-correlation detector for said horizontal scanning period;

a third delay circuit for delaying an output signal of said C-correlation detector for said horizontal scanning period;

an inverter for inverting the filtered input video signal from said first band-pass filter;

a first subtractor for subtracting the filtered video input signals of said first and second band-pass filter;

an amplitude adjusting circuit for adjusting the amplitude of an output of said first subtractor;

said determiner includes a) a first switch determining circuit for selecting a first switch signal based on the output signals of i) said Y-correlation detector, ii)

said C-correlation detector, iii) said second delay circuit and, iv) said third delay circuit, and b) a second switch determining circuit for selecting a second switch signal based on the output signals of i) said Y-correlation detector, ii) said C-correlation detector, iii) said second delay circuit and, iv) said third delay circuit;

said logic circuit includes a) a first switch circuit for selecting one of the output signal of said amplitude adjusting circuit and the output signal of said second band-pass filter, responsive to the first switch signal of the first switch determining circuit, b) a second switch circuit for selecting one of the output signal of said amplitude adjusting circuit and the output signal of said second band-pass filter, responsive to the second switch signal of the second switch determining circuit, and c) a 3-line-comb operational circuit whose input is the output signal of said inverter and an output of said first switch circuit and an output of said second switch circuit;

a second subtractor for subtracting an output signal of said 3-line-comb operational circuit from the output signal of said first delay circuit; and a filter circuit for filtering the output signal of said 3-line-comb operational circuit.

12. A 2-line YC separation device according to claim 1, further comprising:

a first delay circuit for delaying the input video signal for a horizontal scanning period;

said filter includes i) a first band-pass filter for filtering the input video signal and producing the filtered input video signal, and ii) a second-band pass filter for filtering the output signal of said first delay circuit;

a YC-level detector for detecting a YC level in the output signal of said first band-pass filter and the output signal of said second band-pass filter;

said correlator includes i) a C-correlation detector for correlating chrominance in the output signal of said first band-pass filter, the output signal of said second band-pass filter and, an output signal of said YC-level detector, and ii) a Y-correlation detector for correlating luminance in the output signal of said first band-pass filter, the output signal of said second band-pass filter and, an output signal of said YC-level detector;

a second delay circuit for delaying an output signal of said Y-correlation detector for said horizontal scanning period;

a third delay circuit for delaying an output signal of said C-correlation detector for said horizontal scanning period;

an inverter for inverting the filtered input video signal of said first band-pass filter;

a first subtractor for subtracting the filtered video signals of said first and second band-pass filters;

an amplitude adjusting circuit for adjusting an amplitude of the output of said first subtractor;

said determiner includes a) a first switch determining circuit for selecting a first switch signal based on the output signals of i) said Y-correlation detector, ii) said C-correlation detector, iii) said second delay circuit and, iv) said third delay circuit, and b) a second switch determining circuit for selecting a second switch signal based on the output signals of i) said Y-correlation detector, ii) said C-correlation detector, iii) said second delay circuit and, iv) said third delay circuit;

said logic circuit includes a selector for selecting one of i) the output signal of said inverter, ii) the output signal of said second band-pass filter circuit, and iii) the output signal of said amplitude adjusting circuit, responsive to the first switch signal of said first switch determining circuit and the second switch signal of said second switch determining circuit;

a second subtractor for subtracting the output signal of said first delay circuit and the output signal of said selector; and a filter circuit for filtering the output signal of said selector.

13. A 2-line YC separation device comprising:

a first delay circuit for delaying an input video signal for a horizontal scanning period;

a first band-pass filter for filtering the input video signal and producing a filtered input video signal;

a second-band pass filter for filtering an output signal of said first delay circuit;

a Y-correlation detector for correlating luminance outputs from said first band-pass filter and said second band-pass filter;

a C-correlation detector for correlating chrominance outputs from said first band-pass filter and said second band-pass filter;

a second delay circuit for delaying an output signal of said Y-correlation detector for said horizontal scanning period;

a third delay circuit for delaying an output signal of said C-correlation detector for said horizontal scanning period;

a first inverter for inverting the filtered input video signal from said first band-pass filter;

a first subtractor for subtracting the filtered video input signals of said first and second band-pass filters;

an amplitude adjusting circuit for adjusting an amplitude of an output of said first subtractor;

a first switch determining circuit for selecting a first switch signal based on the output signals of i) said Y-correlation detector, ii) said C-correlation detector, iii) said second delay circuit and iv) said third delay circuit;

a second switch determining circuit for selecting a second switch signal based on the output signals of i) said Y-correlation detector, ii) said C-correlation detector, iii) said second delay circuit and, iv) said third delay circuit;

a second inverter for inverting the output signal of said second band-pass filter;

a first switch circuit for selecting one of i) the output signal of said amplitude adjusting circuit, ii) the output signal of said second inverter, and iii) the output signal of said second band-pass filter, responsive to the first switch signal of said first switch determining circuit;

a second switch circuit for selecting one of the output signal of said amplitude adjusting circuit and the output signal of said second band-pass filter, responsive to the second switch signal of said second switch determining circuit;

a 3-line-comb operational circuit whose input is i) the output signal of said first inverter ii) an output of said first switch circuit and iii) an output of said second switch circuit;

a second subtractor for subtracting an output signal of said 3-line-comb operational circuit from the output signal of said first delay circuit; and a filter for filtering the output signal of said 3-line-comb operational circuit.

14. A 2-line YC separation device for use with an input video signal comprising:

a first filter for filtering the input video signal and generating a filtered input video signal;

a first delay circuit for delaying the input video signal for a horizontal scanning period and generating a delayed input video signal;

a second filter coupled to the first delay circuit, said second filter filters the delayed input video signal and generates a filtered delayed input video signal;

a correlator for correlating the filtered input video signal, said correlator correlates the filtered input video signal and the filtered delayed input video signal;

a determiner for generating a plurality of switch control signals based on the output from said correlator;

an amplitude adjuster for adjusting the amplitude of the filtered input video signal and the filtered delayed input video signal; and a logic circuit for generating an output based on an output from said amplitude adjuster and an output from said second filter responsive to said plurality of switch control signals from said determiner.

15. A 2-line YC separation device of claim 14, further comprising:

a second delay circuit for delaying the output of said correlator by the horizontal scanning period; and an inverter for inverting the filtered input video signal;

wherein said determiner generates said plurality of switch control signals based on the output from said correlator and an output from said second delay circuit and said logic circuit generates the output based on the output from said amplitude adjuster, said second filter, and said inverter responsive to said plurality of switch control signals from said determiner.

* * * * *